(12) United States Patent
Kumihashi et al.

(10) Patent No.: US 10,175,471 B2
(45) Date of Patent: Jan. 8, 2019

(54) IMAGING DEVICE INCLUDING A CONTROL UNIT CONFIGURED TO COUNTERACT VIBRATION

(71) Applicant: NEC Corporation, Minato-ku, Tokyo (JP)

(72) Inventors: Isamu Kumihashi, Tokyo (JP); Kazuyuki Egashira, Tokyo (JP); Kazuhiko Aoki, Tokyo (JP); Hidehiko Kuroda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/546,346

(22) PCT Filed: Feb. 10, 2016

(86) PCT No.: PCT/JP2016/000696
§ 371 (c)(1),
(2) Date: Jul. 26, 2017

(87) PCT Pub. No.: WO2016/129283
PCT Pub. Date: Aug. 18, 2016

(65) Prior Publication Data
US 2018/0024350 A1    Jan. 25, 2018

(30) Foreign Application Priority Data

Feb. 12, 2015  (JP) ................................. 2015-024959

(51) Int. Cl.
*G02B 26/08*  (2006.01)
*G03B 5/00*  (2006.01)
(Continued)

(52) U.S. Cl.
CPC ......... *G02B 26/0816* (2013.01); *G02B 26/08* (2013.01); *G03B 5/00* (2013.01);
(Continued)

(58) Field of Classification Search
CPC ............. G02B 26/0816; H04N 5/2252; H04N 5/23258; H04N 5/23287
See application file for complete search history.

(56) References Cited

U.S. PATENT DOCUMENTS 6,130,993 A    10/2000  Hayakawa
6,992,700 B1 *  1/2006  Sato ........................ G03B 5/00
                                                       348/208.11
(Continued)

FOREIGN PATENT DOCUMENTS

JP    2000147586 A   5/2000
JP    2004219930 A   8/2004
(Continued)

OTHER PUBLICATIONS

Aoki, K., et al., "Wide-range fine pointing mechanism for free-space laser communications", Free-Space Laser Communication and Active Laser Illumination III, SPIE Proceedings, vol. 5160, 2003, pp. 495-506 (12 pages total).
(Continued)

*Primary Examiner* — Antoinette T Spinks

(57) ABSTRACT

It is an object of the present invention to drive a mirror in a wide driving range and at a fast response speed. An imaging device 100 includes an imaging element 103, a mirror 102, a lens 101, and a mirror tilt actuator 110. The imaging element 103 images subject light that is reflected light from a subject. The mirror 102 reflects the subject light, and makes the subject light incident on the imaging element 103. The lens 101 collects the subject light on the mirror 102. The mirror tilt actuator 110 drives the mirror 102 so as to change an optical axis of the lens OAL. The optical axis of the lens OAL is an optical axis to be incident on the central part C of the imaging element 103 in the subject light exited from the lens 101.

4 Claims, 17 Drawing Sheets

(51) Int. Cl.
*H04N 5/225* (2006.01)
*H04N 5/232* (2006.01)
(52) U.S. Cl.
CPC .......... *H04N 5/225* (2013.01); *H04N 5/2252* (2013.01); *H04N 5/232* (2013.01); *H04N 5/23258* (2013.01); *H04N 5/23287* (2013.01)

(56) References Cited

U.S. PATENT DOCUMENTS

2004/0141065 A1* 7/2004 Hara .................... H04N 5/2254
 348/208.11
2006/0067672 A1 3/2006 Washisu et al.

FOREIGN PATENT DOCUMENTS

| JP | 2007-104445 A | 4/2007 |
| JP | 2007-214662 A | 8/2007 |
| JP | 2010237273 A * | 10/2010 |
| JP | 2013-225158 A | 10/2013 |
| JP | 2014092756 A * | 5/2014 |
| JP | 5614478 B2 | 10/2014 |
| WO | 2011007628 A1 | 1/2011 |

OTHER PUBLICATIONS

Extended European Search Report for EP Application No. EP16748928.5 dated Jul. 2, 2018.
Extended European Search Report for EP Application No. EP16748928.5 dated Oct. 1, 2018.

* cited by examiner

Fig. 14

| PLATE SPRING WIDTH | 4mm |
|---|---|
| PLATE SPRING THICKNESS | 80 μm |
| PLATE SPRING MATERIAL | STAINLESS STEEL JIS STANDARD SUS401 |
| MIRROR DIAMETER | 20mm |
| SHAKING CONDITIONS | AMPLITUDE:100mN<br>FREQUENCY:10Hz～10000Hz<br>SHAKING PLACE:COIL PART |

IMAGING DEVICE INCLUDING A CONTROL UNIT CONFIGURED TO COUNTERACT VIBRATION

This application is a National Stage Entry of PCT/JP2016/000696 filed on Feb. 10, 2016, which claims priority from Japanese Patent Application 2015-024959 filed on Feb. 12, 2015, the contents of all of which are incorporated herein by reference, in their entirety.

TECHNICAL FIELD

The present invention relates to an imaging device, and, for example, relates to one that reflects subject light that is reflected light from a subject by a mirror and makes the subject light incident on an imaging element while driving the mirror by a mirror tilt actuator.

BACKGROUND ART

In recent years, a technology in which an imaging device, such as a camera, is mounted on the outside of an aircraft, such as a helicopter, an airplane, or an airship, and the ground is imaged from the above using the imaging device is widely known.

When a subject is imaged by the imaging device mounted on the aircraft, a shaking disturbance that is external force, such as vibration of the aircraft itself and vibration due to turbulence, and a posture change generated by the vibration of the aircraft itself and the turbulence are transmitted to the imaging device, and thus, a captured image sometimes became indistinct.

An attempt to reduce the influence of the shaking disturbance and the posture change is made by, for example, adding a mirror on an optical path between a light source and an imaging element and driving the mirror in a direction in which vibration due to the shaking disturbance, the posture change, and the like is counteracted when reflected light from the subject is collected to make the reflected light incident on the imaging element.

As a technology to drive a mirror in accordance with a shaking disturbance or a posture change, for example, a biaxial piezo imaging device and a biaxial cymbal imaging device are known. In the biaxial piezo imaging device, generally, the influence of vibration due to the shaking disturbance, the posture change, and the like was reduced by driving a mirror in two axes directions using a piezoelectric element. In the biaxial cymbal imaging device, generally, the influence of vibration due to the shaking disturbance, the posture change, and the like was reduced by driving a mirror attached to a rotating body that rotates biaxially using a motor.

It is to be noted that technologies related to the present invention are described in PTL 1, PTL 2, and NPL 1, for example.

CITATION LIST

Patent Literature

[PTL 1] JP 5614478 B2
[PTL 2] WO 2011/007628

Non Patent Literature

[NPL 1] K. Aoki, et al, "Wide-range fine pointing mechanism for free-space laser communications," Free-Space Laser Communication and Active Laser Illumination III, SPIE Proceedings, Vol. 5160, pp. 495-506, 2003

SUMMARY OF INVENTION

Technical Problem

However, in the biaxial piezo imaging device, generally, the mirror is driven using the piezoelectric element, and thus, there was a problem that a range of movement of the mirror is narrow although the response speed is increased.

In addition, in the biaxial cymbal imaging device, the mirror is driven using the motor, and thus, there was a problem that the response speed is slow. In particular, when the vibrational frequency based on the shaking disturbance, the posture change, and the like became tens of Hz or more, the vibration due to the shaking disturbance, the posture change, and the like could not be absorbed by only the movement of the mirror. Thus, an isolator was provided at a junction part between the imaging device and the aircraft, and the vibration in a high frequency band was absorbed by the isolator.

Therefore, there was a problem that a method in which the mirror is driven using a drive mechanism by the piezoelectric element, as the biaxial piezo imaging device, may not respond to the vibration due to the shaking disturbance, the posture change, and the like, by which the amplitude of the mirror is large. In addition, a method in which the mirror is driven using a drive mechanism by the motor, as the biaxial cymbal imaging device, could not respond to high-frequency vibration due to the shaking disturbance, the posture change, and the like.

The present invention has been made in view of these circumstances, and an object of the present invention is to provide an imaging device capable of driving a mirror in a wide driving range and at a fast response speed.

Solution to Problem

An imaging device of the present invention includes: an imaging element that images subject light that is reflected light from a subject; a mirror that reflects the subject light, and makes the subject light incident on the imaging element; a lens that collects the subject light on the mirror; and a mirror tilt actuator that drives the mirror so as to change an optical axis of the lens, which is an optical axis to be incident on a central part of the imaging element in the subject light exited from the lens, in which the mirror tilt actuator has: a base; a mirror holder that holds the mirror; an elastic member that supports the mirror holder on the base such that the mirror holder can move with respect to the base; and driving means that tilts the mirror holder with respect to the base to change the optical axis of the lens to a desired direction, and the driving means has a coil attached to the base and a magnetic circuit having a permanent magnet, which is attached to the mirror holder, and tilts the mirror holder in a direction perpendicular to a direction of magnetic moment of the permanent magnet using electromagnetic force acting between the coil and the magnetic circuit.

Advantageous Effects of Invention

According to the imaging device of the present invention, the mirror can be driven in a wide driving range and at a fast response speed.

BRIEF DESCRIPTION OF DRAWINGS

FIG. 14 is a diagram illustrating analysis conditions.

FIG. 22(a) is a diagram illustrating a state of the imaging device before the mirror is moved. FIG. 22(b) is a diagram illustrating a state of the imaging device after the mirror is moved.

DESCRIPTION OF EMBODIMENTS

First Exemplary Embodiment

Figure 1:
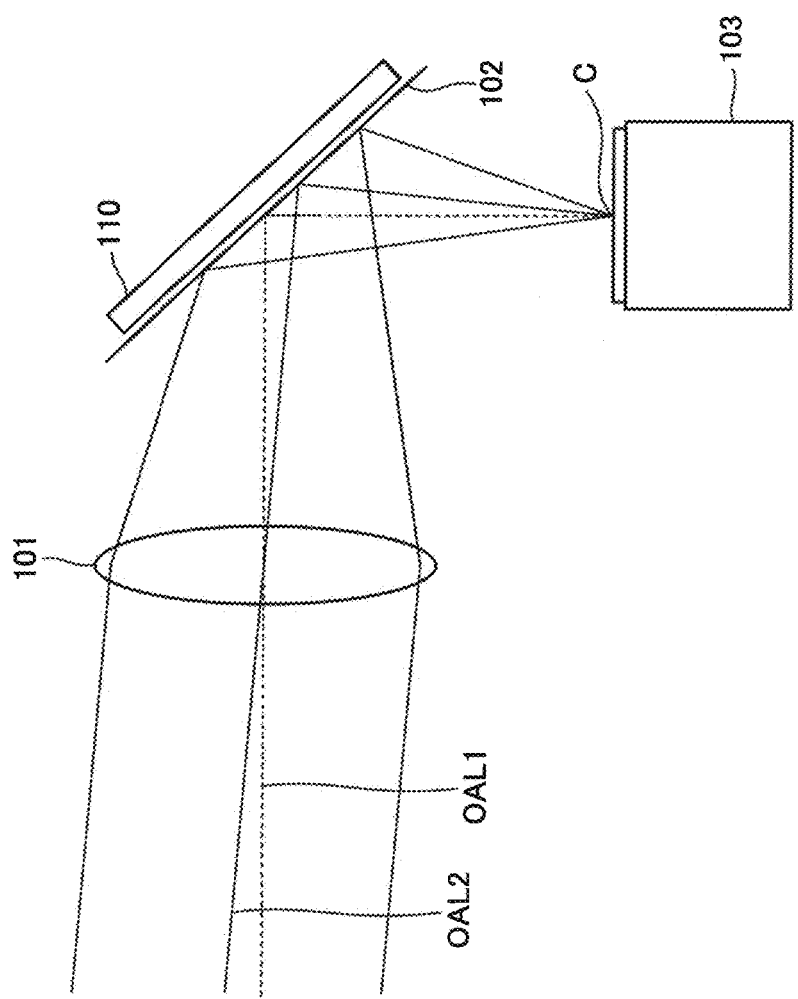
FIG. 1 is a diagram illustrating a configuration of an imaging device in a first exemplary embodiment of the present invention.

FIG. 1 is a diagram illustrating a configuration of an imaging device 100 in a first exemplary embodiment of the present invention.

As illustrated in FIG. 1, the imaging device 100 includes a lens 101, a mirror 102, an imaging element 103, and a mirror tilt actuator 110.

As illustrated in FIG. 1, the lens 101 is provided so as to be opposed to the mirror 102. The lens 101 collects subject light that is reflected light from a subject on the mirror 102.

As illustrated in FIG. 1, the mirror 102 is provided so as to be opposed to the lens 101 and the imaging element 103. The mirror 102 reflects the subject light, and makes the subject light incident on the imaging element 103.

As illustrated in FIG. 1, the imaging element 103 is provided so as to be opposed to the mirror 102. The imaging element 103 images the subject light.

As illustrated in FIG. 1, the mirror tilt actuator 110 is attached to the back surface side of the mirror 102. The mirror tilt actuator 110 drives the mirror 102 so as to change an OAL (optical axis of the lens), which is an optical axis to be incident on the central part C of the imaging element 103 in the subject light exited from the lens 101. It is to be noted that, in FIG. 1, an optical axis of the lens before the change OAL1 and an optical axis of the lens after the change OAL2 are illustrated.

Here, the configuration of the mirror tilt actuator 110 will be described in detail. It is to be noted that the configuration of the mirror tilt actuator 110 corresponds to a mirror tilt actuator described in PTL 1.

Figure 2:
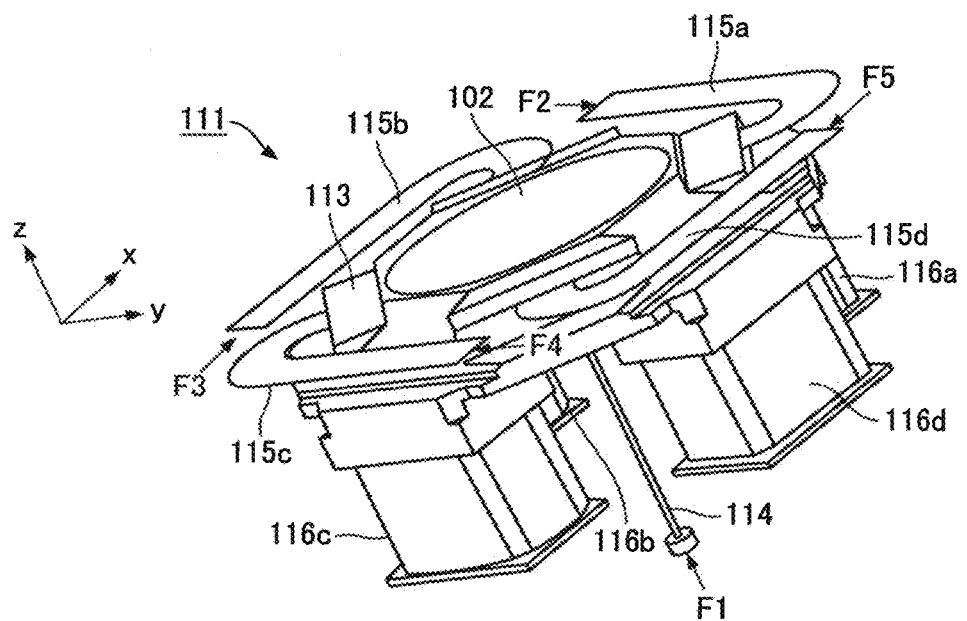
FIG. 2 is a perspective view illustrating a configuration of a movable part of a mirror tilt actuator.

FIG. 2 is a perspective view illustrating a configuration of a movable part 111 of the mirror tilt actuator 110. It is to be noted that the movable part 111 is combined with a base 117 described below. More specifically, the mirror tilt actuator 110 is configured by including the movable part 111 and the base 117.

As illustrated in FIG. 2, the movable part 111 of the mirror tilt actuator 110 includes a mirror holder 113, a torsion bar 114, plate springs 115a to 115d, and coils 116a to 116d. In addition, the mirror tilt actuator 110 holds the mirror 102 by the mirror holder 113.

As illustrated in FIG. 2, the mirror holder 113 holds the mirror 102.

As illustrated in FIG. 2, the torsion bar 114 extends from the center of the mirror holder 113 in the Z direction. The torsion bar 114 is formed by alloy having high proof stress, such as a plano wire and cobalt alloy.

As illustrated in FIG. 2, the plate springs 115a to 115d are flat plate-like elastic members. The plate springs 115a to 115d extend from the outer edge part of the mirror holder 113 along the mirror holder 113. Each of the plate springs 115a to 115d has at least one bent part. The plate springs 115a to 115d support the mirror holder 113 on the base 117 such that the mirror holder 113 can move with respect to the base 117. It is to be noted that the plate springs 115a to 115d are the elastic member of the present invention.

Figure 3:
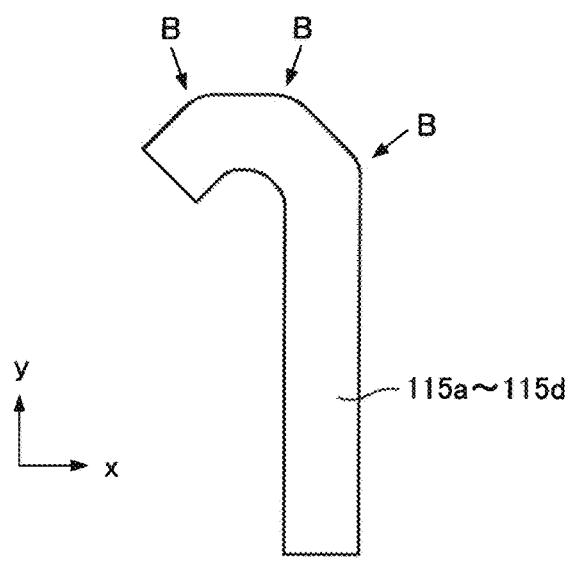
FIG. 3 is a diagram illustrating a shape of plate springs used in the movable part.

FIG. 3 is a diagram illustrating a shape of the plate springs 115a to 115d used in the movable part 111. As illustrated in FIG. 3, the four plate springs 115a to 115d are formed into the same shape. In FIG. 3, each of the plate springs 115a to 115d has three bent parts B. The plate springs 115a to 115d are thin flat plate-like springs parallel to the XY plane. The thickness of the plate springs 115a to 115d is within a range from 20 μm to 200 μm, for example. For the plate springs 115a to 115d, alloy having high proof stress is used. Specifically, as a material for the plate springs 115a to 115d, at least one material selected from the group consisting of stainless steel, beryllium copper, phosphor bronze, nickel silver, nickel copper alloy, and titanium copper alloy is used.

The coils 116a to 116d are configured by solenoidal coils, for example. The coils 116a to 116d are attached to the opposite surface of the insertion surface of the mirror 102 of the mirror holder 113 so as to be paired about the X axis and the Y axis. The movable part 111 is fixed to the base 117 (not illustrated in FIG. 2) through a contact surface F1 of the torsion bar 114 and contact surfaces F2 to F5 of the plate springs 115a to 115d.

Figure 4:
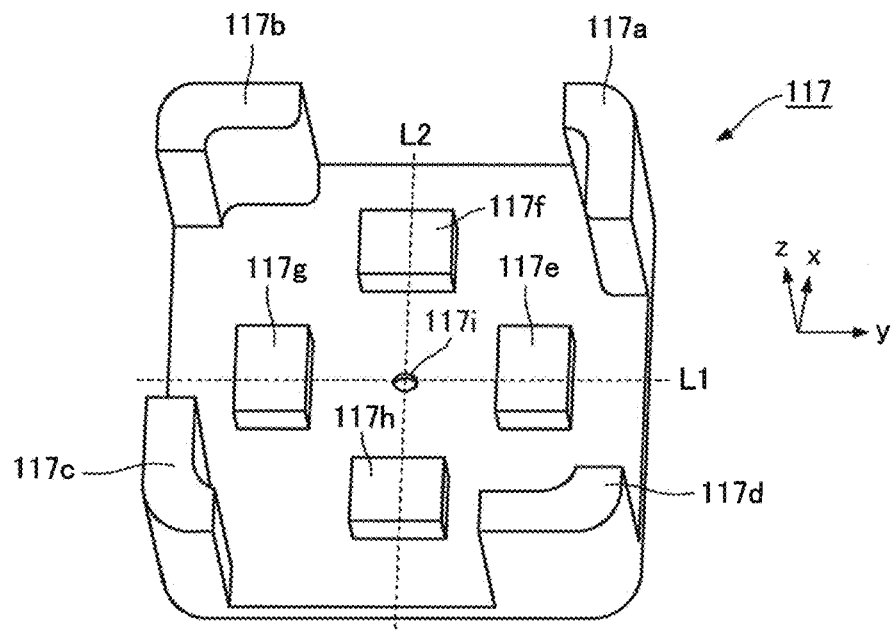
FIG. 4 is a perspective view illustrating an outline of a base.

FIG. 4 is a perspective view illustrating an outline of the base 117. The movable part 111 of FIG. 2 is attached to the base 117 together with the mirror 102. The base 117 has fixing tables 117a to 117h and a fixing hole 117i. The fixing tables 117a to 117d are junction parts between the plate springs 115a to 115d and the base 117. The fixing tables 117a to 117d are arranged in the vicinity of the edge (outer peripheral edge) of the base 117 so as to be 90° rotationally symmetric about the fixing hole 117i.

The fixing tables 117e to 117h are fixing tables of magnetic circuits for driving the coils 116a to 116d. The fixing tables 117e to 117h exist on center lines L1, L2 of the base 117 in a positional relationship where the respective fixing tables are symmetric on the X axis and the Y axis. More specifically, the fixing tables 117e to 117h are arranged on the straight lines L1, L2 set to pass the center of the fixing hole 117i and be perpendicular to each other. In addition, the distances from the fixing tables 117a to 117d to the fixing hole 117i are set to be the same. The fixing hole 117i is a fixing hole of the torsion bar 4. The fixing hole 117i exists at the center of the base 117.

Figure 5:
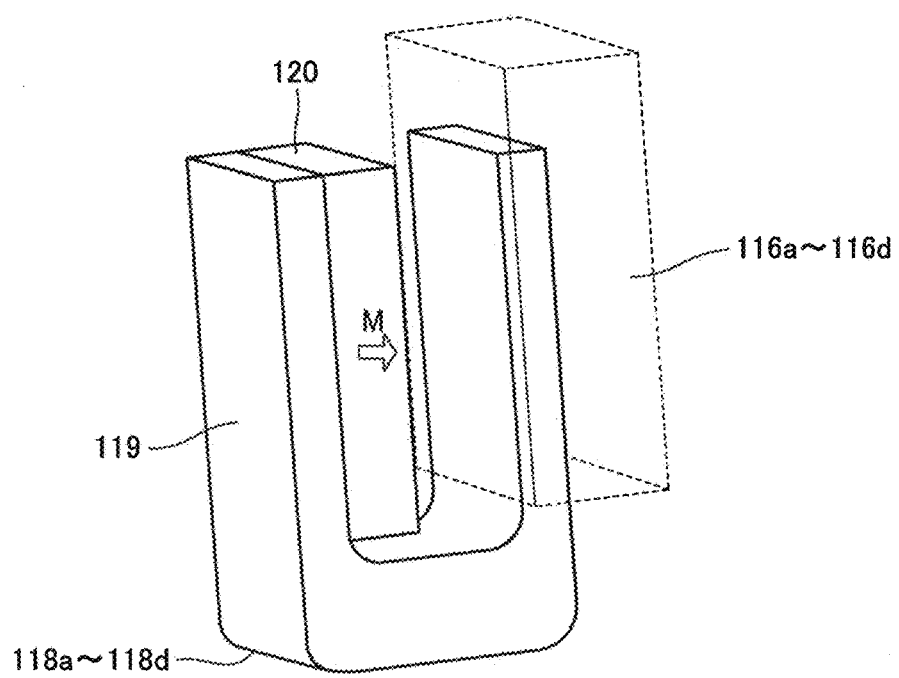
FIG. 5 is a diagram illustrating an outline of magnetic circuits.

FIG. 5 is a diagram illustrating an outline of magnetic circuits 118a to 118d. The magnetic circuits 118a to 118d are used for driving the coils 116a to 116d. The magnetic circuits 118a to 118d are fixed to the fixing tables 117e to 117h, respectively. The four magnetic circuits 118a to 118d have the same shape and the same configuration. The coils 116a to 116d and the magnetic circuits 118a to 118d configure driving means for tilting the mirror holder 113. The driving means of the present exemplary embodiment is configured by a plurality of pairs of the coils 116a to 116d and a plurality of pairs of the magnetic circuits 118a to 118d. The driving means tilts the mirror holder 113 with respect to the base 117 to change the optical axis of the lens OAL to a desired direction. Here, the driving means can tilt the mirror holder 113 in at least two directions.

As illustrated in FIG. 5, each of the magnetic circuits 118a to 118d has a yoke 119 with laterally U-shaped (in katakana) or a U-shaped (in alphabet) cross section and a permanent magnet 120. The permanent magnet 120 is attached to one surface of a void part of the yoke 119. The permanent magnet 120 is attached such that the direction of magnetic moment M thereof is perpendicular to surfaces of the void part of the yoke 119. Each of the coils 116a to 116d of the movable part 111 is inserted into the side of the yoke 119, to which the permanent magnet 120 is not attached.

Figure 6:
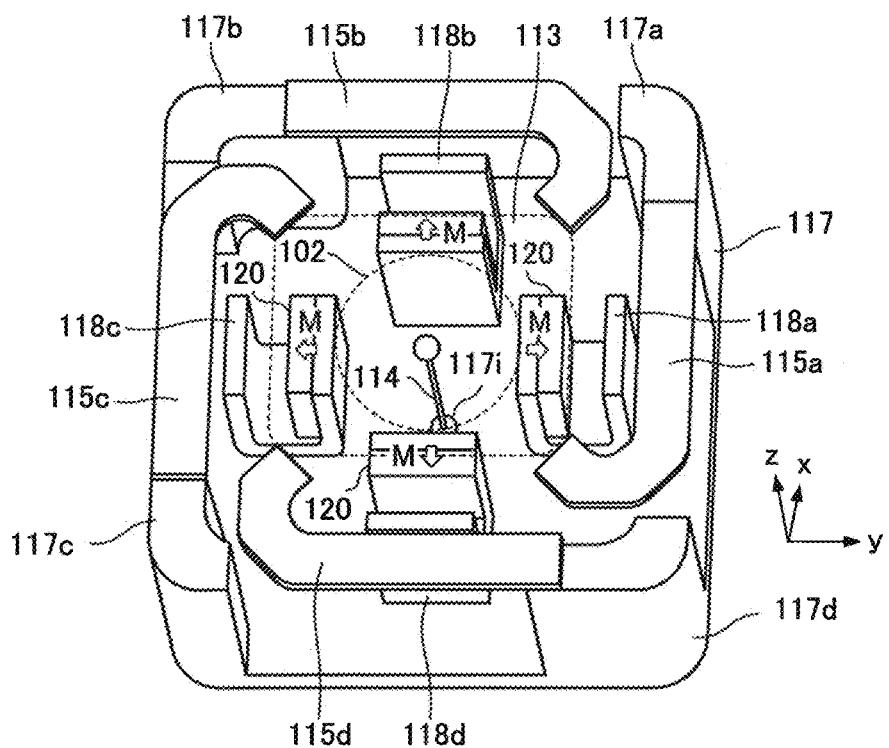
FIG. 6 is a perspective view illustrating a mounting state of the plate springs, a torsion bar, and the magnetic circuits.

FIG. 6 is a perspective view illustrating a mounting state of the plate springs 115a to 115d, the torsion bar 114, and the magnetic circuits 118a to 118d. As illustrated in FIG. 6, the plate springs 115a to 115d, the torsion bar 114, and the magnetic circuits 118a to 118d are mounted on the base 117. The plate springs 115a to 115d of the movable part 111 are fixed to the fixing tables 117a to 117d. The torsion bar 114 is fixed to the fixing hole 117i. The magnetic circuits 118a to 118d are fixed such that the permanent magnets 120 are situated nearer the center side of the base 117. As illustrated in FIG. 6, the directions of the magnetic moment M in the magnetic circuits 118a to 118d are all directions from the center of the base 117 to the outside.

Figure 7:
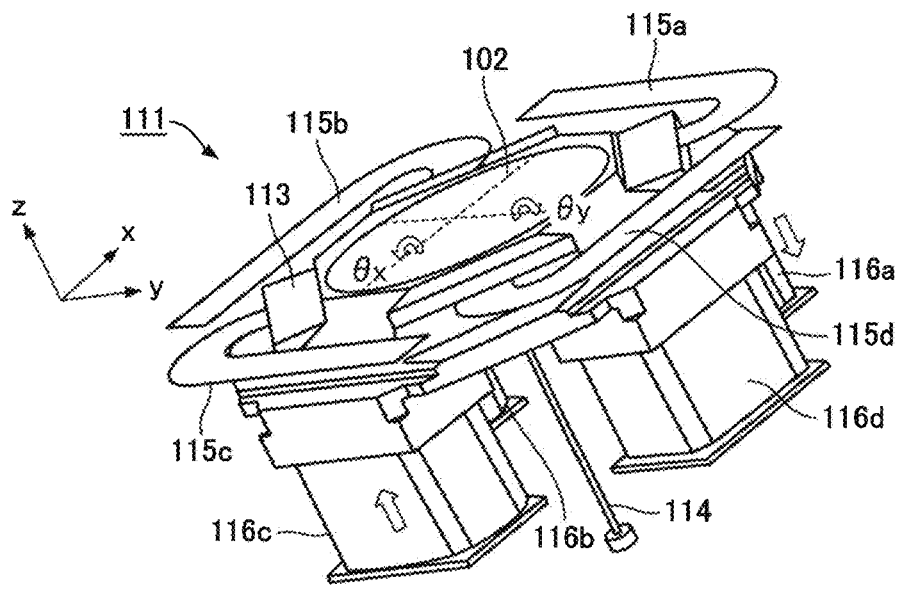
FIG. 7 is a diagram illustrating a mechanism of tilt generation in the movable part illustrated in FIG. 2.

FIG. 7 is a diagram illustrating a mechanism of tilt generation in the movable part 111 illustrated in FIG. 2. A current is made to flow in the coil 116a in a clockwise direction toward the mirror 102. In addition, a current is made to flow in the coil 116c in a counterclockwise direction toward the mirror 102. The current made to flow in the coil 116a and the current made to flow in the coil 116c have the same current value. The magnetic moment M of the magnetic circuits 118a, 118c are set to be the directions from the center to the outside, as illustrated in FIG. 6. Thus, force acts on the coil 116a in the −Z direction and force acts on the coil 116c in the +Z direction in accordance with Fleming's rule. At this time, the torsion bar 114 suppresses translation of the mirror holder 113 in the Z direction, and thus, the mirror 102 (the mirror holder 113) rotates (tilts) in a θy direction.

In addition, a current is made to flow in the coil 116b in the clockwise direction toward the mirror 102, and the same amount of a current as that in the coil 116b is made to flow in the coil 116d in the counterclockwise direction toward the mirror 102. In this case, force acts on the coil 116b in the −Z direction and force acts on the coil 116d in the +Z direction by the same action described above. Accordingly, the mirror 102 rotates (tilts) in a θx direction.

It is to be noted that the arrangement of the magnetic circuits is not limited to FIG. 6. More specifically, the arrangement of the magnetic circuits is not limited to arrangement in which the magnetic moment M is directed to the outside with respect to the center in each of the magnetic circuits.

Figure 8:
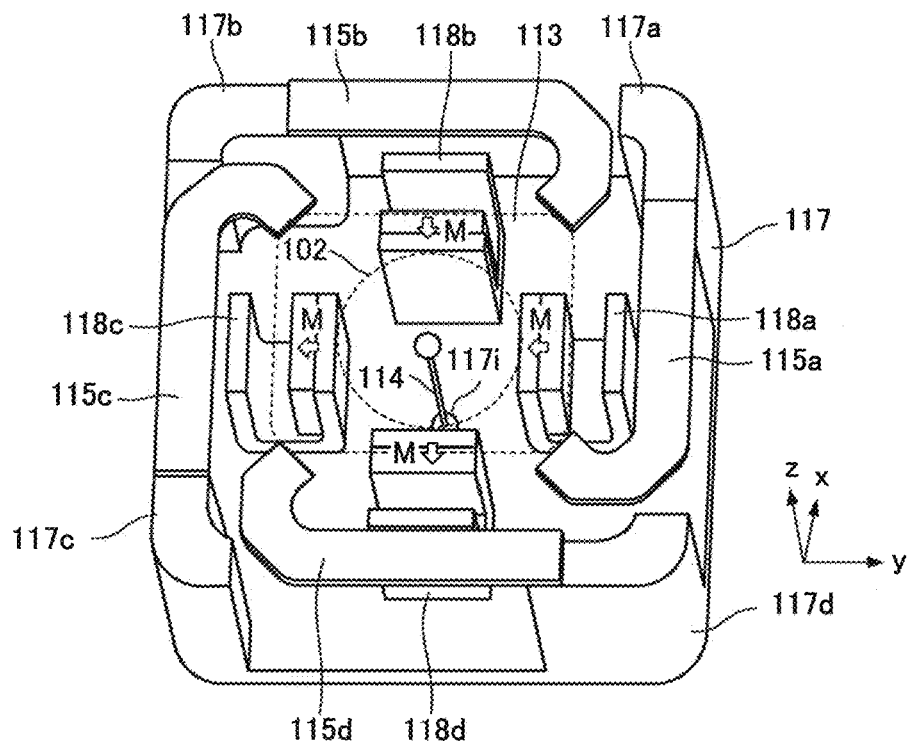
FIG. 8 is a perspective view illustrating a modified example of the mounting state of the plate springs, the torsion bar, and the magnetic circuits.

FIG. 8 is a perspective view illustrating a modified example of the mounting state of the plate springs 115a to 115d, the torsion bar 114, and the magnetic circuits 118a to 118d.

In FIG. 8, the magnetic circuits 118a, 118c are arranged such that the magnetic moment M of the magnetic circuit 118a and the magnetic moment M of the magnetic circuit 118c become the same direction. In addition, the magnetic circuits 118b, 118d are arranged such that the magnetic moment M of the magnetic circuit 118b and the magnetic moment M of the magnetic circuit 8d become the same direction. When the arrangement of the magnetic circuits is the arrangement illustrated in FIG. 8, the mirror can be tilted in the θy direction by making a current in the same direction flow in the coil 116a and the coil 116c. In addition, the mirror can be tilted in the θx direction by making a current in the same rotational direction (for example, the clockwise direction) flow in the coil 116b and the coil 116d.

Although each of the plate springs 115a to 115d has the three bent parts B in FIG. 3, the shape of the plate springs is not limited thereto. The bent part B is not limited to a bent part bent in a linear fashion, and may be a bent part bent in a curved fashion (in a circular arc shape).

Figure 9:
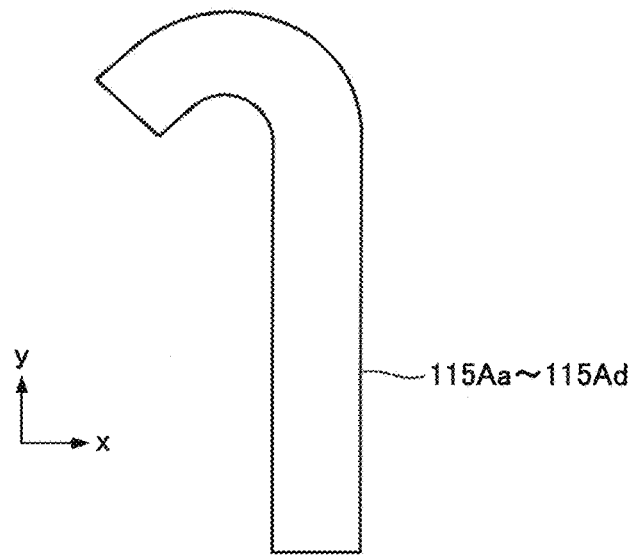
FIG. 9 is a diagram illustrating a first modified example of the plate springs.
Figure 10:
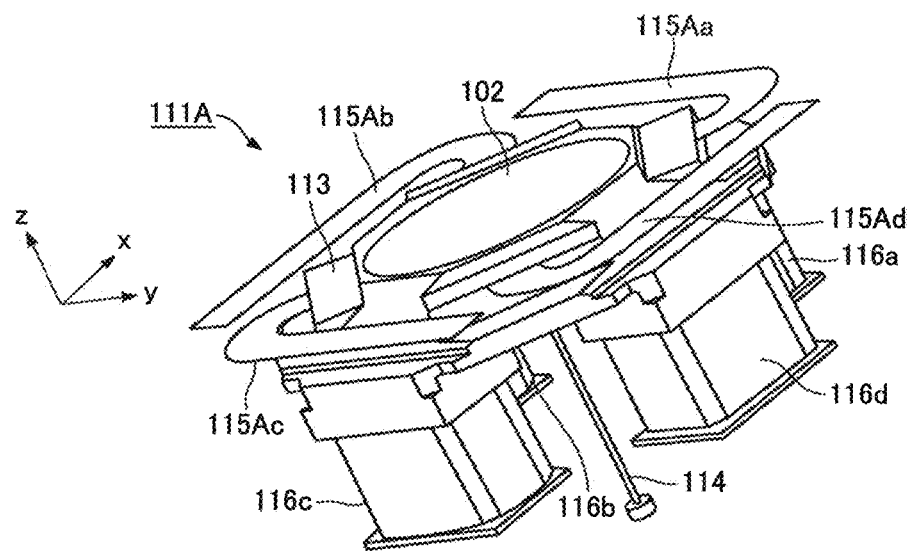
FIG. 10 is a perspective view illustrating a movable part using the plate springs of FIG. 9.

FIG. 9 is a diagram illustrating a first modified example of the plate springs. Plate springs 115Aa to 115Ad illustrated in FIG. 9 are thin plates parallel to the XY plane, and each of the plate springs 115Aa to 115Ad has a circular arc-shaped bent part. FIG. 10 illustrates a movable part 111A using the plate springs 115Aa to 115Ad illustrated in FIG. 9. Also in this case, the operation of the movable part 111A is the same as the operation described using FIG. 7.

Figure 11:
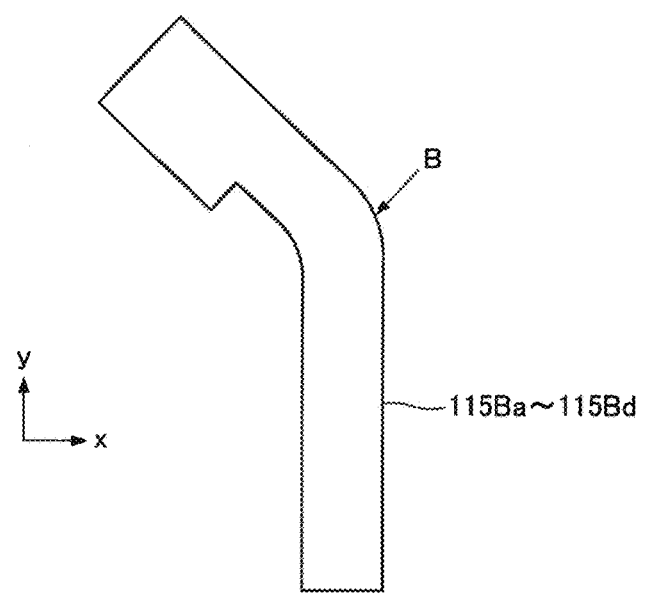
FIG. 11 is a diagram illustrating a second modified example of the plate springs.
Figure 12:
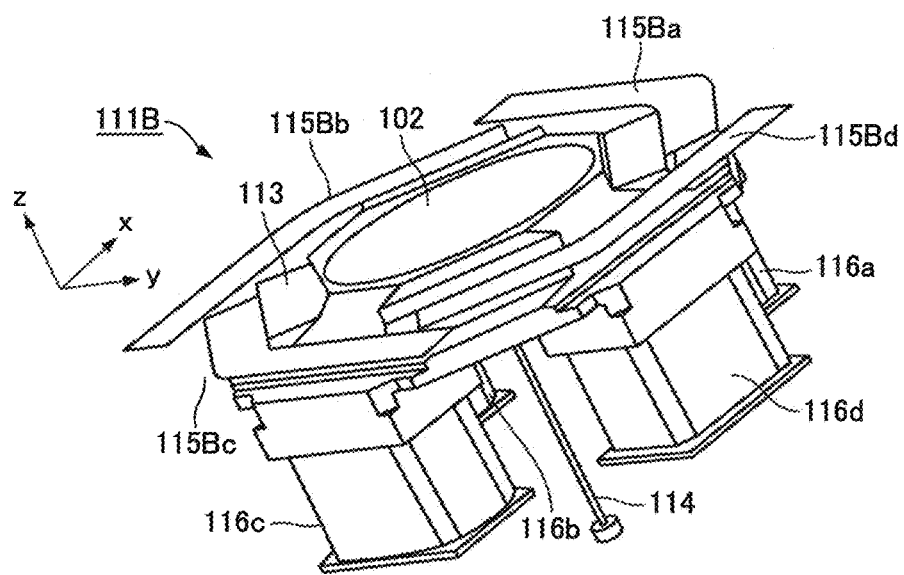
FIG. 12 is a perspective view illustrating a movable part using the plate springs of FIG. 11.

In addition, a plate spring may have only one bent part. FIG. 11 is a diagram illustrating a second modified example of the plate springs. Plate springs 115Ba to 115Bd illustrated in FIG. 11 are thin flat plates parallel to the XY plane, and each of the plate springs 115Ba to 115Bd has one bent part B. FIG. 12 illustrates a movable part 111B using the plate springs 115Ba to 115Bd illustrated in FIG. 11. In the movable part 111B, the side surfaces of the plate springs 115Ba to 115Bd are in contact with the mirror holder 113.

Also in this case, the operation of the movable part 111B is the same as the operation described using FIG. 7.

Regarding the mirror tilt actuator, the frequency characteristics of generated tilt were analyzed using a finite element method. In the analysis, the frequency characteristics of generated tilt were obtained for the movable part 111 having the configuration illustrated in FIG. 2 (model 1), the movable part 111A having the configuration illustrated in FIG. 10 (model 2), and the movable part 111B having the configuration illustrated in FIG. 12 (model 3).

In addition, as a comparative example, the frequency characteristics of a mirror tilt actuator having the structure of NPL 1 were also analyzed.

Figure 13:
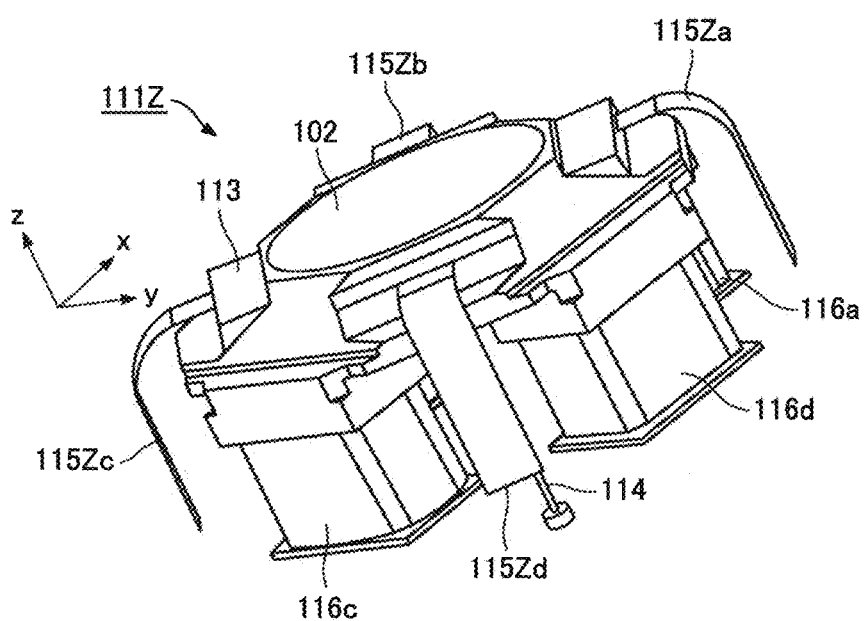
FIG. 13 is a perspective view illustrating a movable part in a mirror tilt actuator described in NPL 1.

FIG. 13 is a perspective view illustrating a movable part 111Z in the mirror tilt actuator described in NPL 1 (model 4). The movable part 111Z of the comparative example illustrated in FIG. 13 is different from the movable part 111 of the present exemplary embodiment illustrated in FIG. 2 in that the mirror holder 113 is attached to the base using plate springs 115Za to 115Zd bent in the Z axis direction from the XY plane.

FIG. 14 is a diagram illustrating analysis conditions. The frequency characteristics of generated tilt were analyzed for model 1 to model 4, using the analysis conditions illustrated in FIG. 14.

Figure 15:
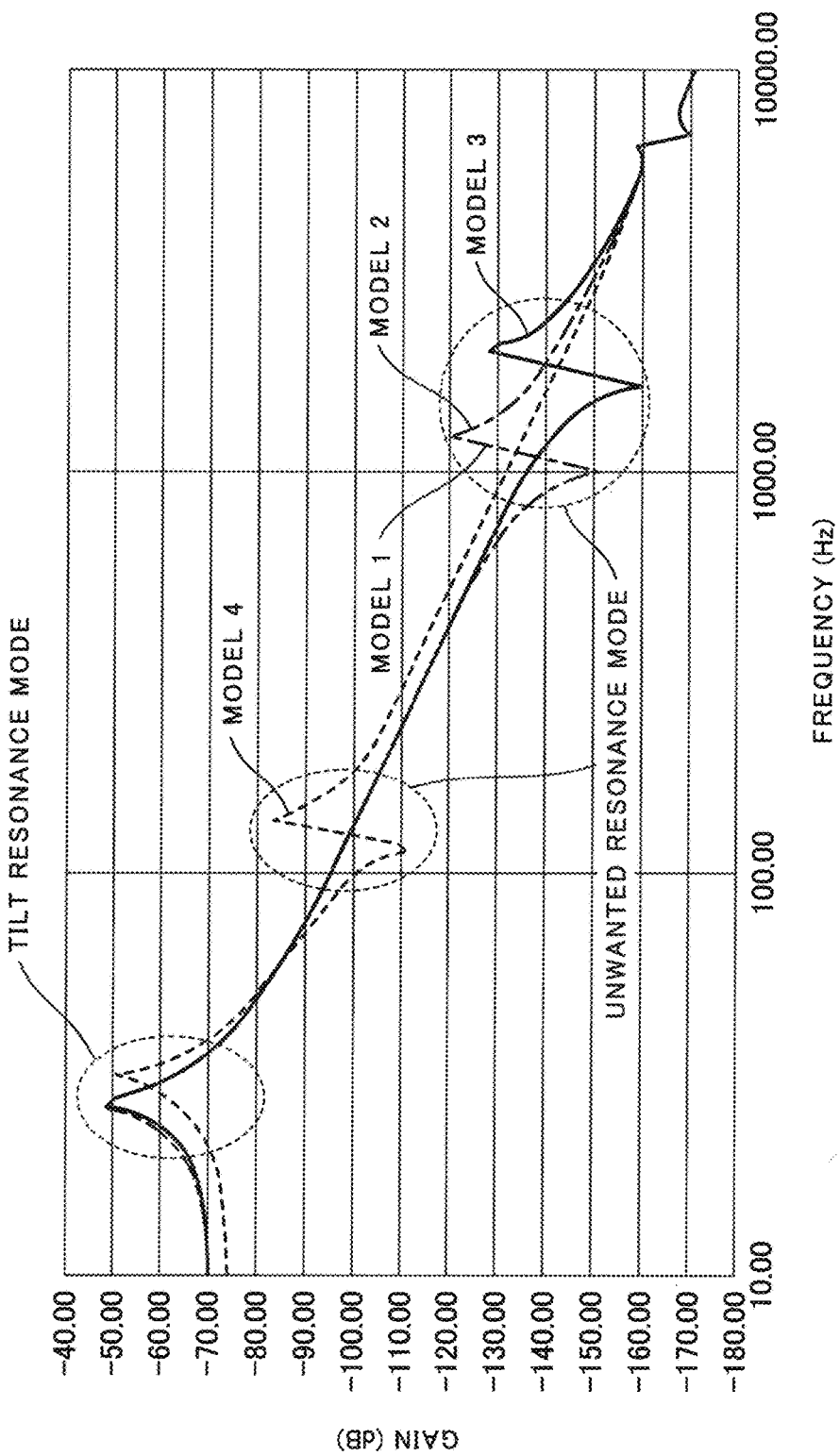
FIG. 15 is a graph illustrating an analysis result of frequency characteristics of generated tilt analyzed using a finite element method.

FIG. 15 is a graph illustrating an analysis result of the frequency characteristics of generated tilt analyzed using the finite element method. As illustrated in FIG. 15, it is found that an S-shaped unwanted resonance mode exists in the vicinity of 100 Hz in model 4 having the structure of NPL 1. The unwanted resonance mode is accompanied by displacement in a translation direction, and thus, is difficult to be controlled.

In contrast, it is found that, in model 1 to model 3 having the configurations of the present exemplary embodiment, unwanted resonance modes are moved to 1000 Hz and a wide control bandwidth can be ensured. In addition, the gain of the generated tilt is not lowered but increases compared to model 4. This means that, in model 1 to model 3, the efficiency of the generated tilt is the same or more than that of the structure of NPL 1 and can ensure the same wide-angle driving and high-accuracy control as those of NPL 1.

Figure 16:
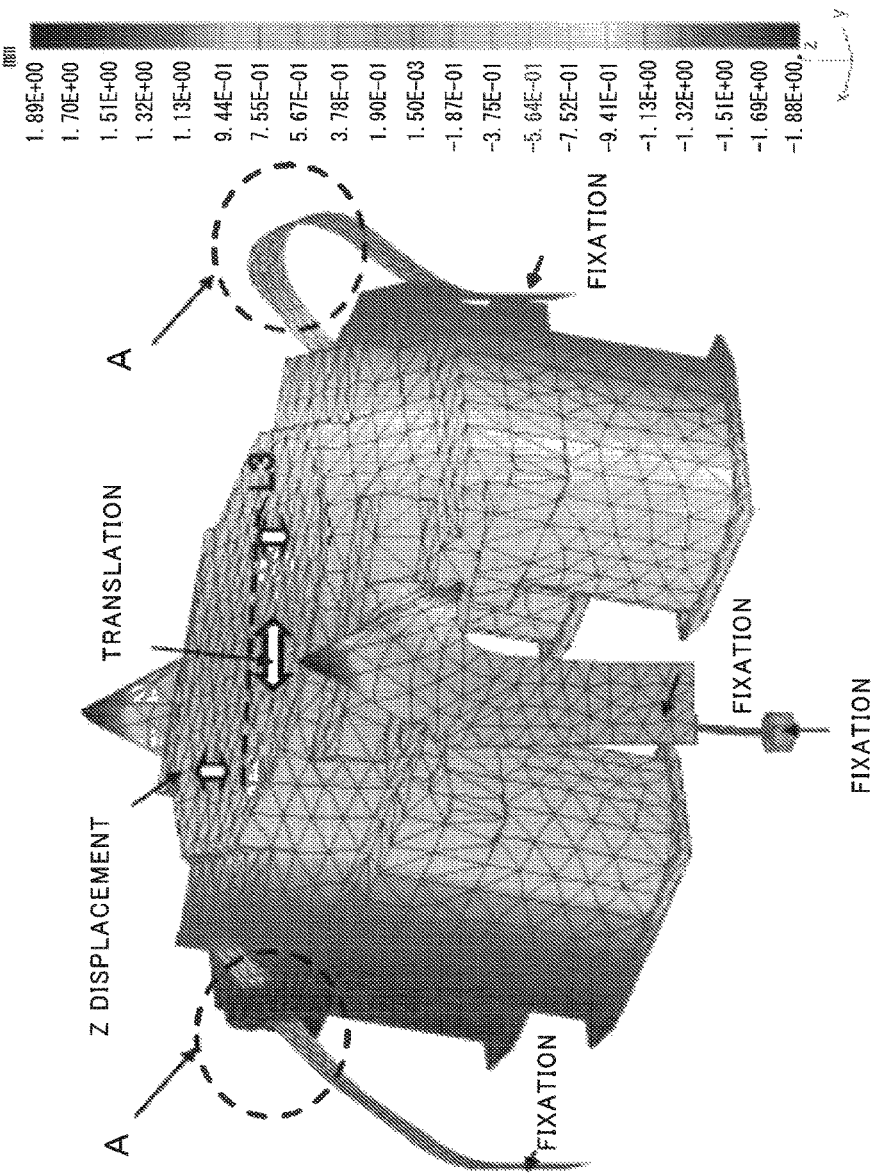
FIG. 16 is a diagram illustrating a situation of an unwanted resonance mode in the movable part illustrated in FIG. 13.

The reason why the above-described effect is produced will be described below. FIG. 16 illustrates a situation of the unwanted resonance mode in the structure of NPL 1 (model 4). The unwanted resonance mode is vibration on a diagonal axis, L3 axis, of the movable part 111Z. In the movable part 111Z, the coils are provided on the rear surface of the mirror holder, and thus, the center of gravity of the movable part 111Z and the rotational center do not coincide. Accordingly, the unwanted resonance mode is accompanied not only by tilt displacement but also by displacement in the translation direction, which is difficult to be controlled.

As illustrated in FIG. 16, regions A of the plate springs 115Za to 115Zd largely deform during the unwanted resonance mode. The deformation is produced in association with a change in bent angles at parts where the plate springs are bent in the Z direction from the XY plane, and can be generated with relatively-small force. In model 4, the stiffness for the vibration on the L3 axis of the movable part 111Z is weak, and thus, the unwanted resonance mode frequency is decreased.

In contrast, the plate springs 115a to 115d (FIG. 3) used in model 1 (the movable part 111) do not have parts which are bent in the Z direction from the XY plane. Similarly, the plate springs 115Aa to 115Ad (FIG. 9) used in model 2 (the movable part 111A) do not have parts bent in the Z direction from the XY plane. Furthermore, the plate springs 115Ba to 115Bd (FIG. 11) used in model 3 (the movable part 111B) do not have parts bent in the Z direction from the XY plane. Thus, the stiffness for the vibration on the L3 axis of the movable part is high, and the unwanted resonance mode frequency is increased. On the other hand, since there are the bent parts bent in the XY plane, the stiffness can be lowered with respect to a mirror tilt direction. Accordingly, a decrease in the efficiency of the generated tilt can be suppressed.

The mirror tilt actuator of the present exemplary embodiment includes, as a minimum configuration, the mirror 102, the mirror holder 113, the base 117, driving means, and a plurality of flat plate-like elastic members. The driving means is configured by including the coils 116a to 116d and the magnetic circuits 118a to 118d. The plurality of flat plate-like elastic members is configured by including the plate springs 115a to 115d, 115Aa to 115Ad, or 115Ba to 115Bd. It is to be noted that one end of the torsion bar 114 is connected to the central part of the mirror holder 113, and the other end thereof is connected to the base 117. One end of each of the plate springs is connected to the peripheral part of the mirror holder 113, and the other end thereof is connected to the base 117. The plate springs extend in a plane parallel to the mirror surface, and each of the plate springs has at least one bent part.

The plate springs that connect the mirror holder 113 and the base 117 extend in the plane parallel to the mirror surface, and each of the plate springs has at least one bent part. The plate springs do not have parts bent in a direction perpendicular to the mirror surface from the mirror surface, and thus, the stiffness for the vibration in the mirror surface direction of the movable part can be increased. Accordingly, the unwanted resonance mode frequency can be increased, and the control bandwidth can be widened. On the other hand, since the plate springs have the bent parts bent in the plane parallel to the mirror surface, the stiffness in the mirror tilt direction can be lowered. More specifically, in the present exemplary embodiment, the effect that the control bandwidth can be widened while suppressing a decrease in the efficiency of the generated tilt can be obtained. In addition, in the case of the configuration in which the plate springs extend from the outer edge part of the mirror holder 113 along the mirror holder 113, the mirror tilt actuator can be downsized.

Here, the plate springs may double as wires for supplying a current to the coils mounted on the mirror holder 113. More specifically, the plate springs 115a to 115d, 115Aa to 115Ad, and 115Ba to 115Bd may be used as wires that make a current for driving the coils flow. In the configuration in which the plate springs double as the wires for supplying a current to the coils, wires do not need to be separately provided between the base 117 and the mirror holder 113. In addition, since the plate springs have elasticity, a decrease in control performance due to friction of the conductive wires that supply a current to the coils can be prevented. In addition, there is an effect that damage of the conductive wires due to repeated stress during driving the actuator can also be prevented.

It is to be noted that, although a moving coil system in which the coils 116a to 116d are arranged on the mirror holder 113 on the movable side and the magnetic circuits 118a to 118d are arranged on the base 117 on the fixed side is used in the above-described exemplary embodiment, the arrangement of the coils and the arrangement of the magnetic circuits may be reversed. More specifically, a moving magnet system in which the magnetic circuits are arranged on the mirror holder 113 on the movable side and the coils are arranged on the base 117 on the fixed side may be used. When the moving magnet system is used, the amount of heat generated in the coils and to be transferred to the mirror holder 113 is reduced compared to the moving coil system, and thus, there is an effect that deformation of the mirror 102 due to the heat from the coils can be suppressed.

The shapes of the plate springs illustrated in FIG. 3, FIG. 9, and FIG. 11 are illustrations, and the shape of the plate springs is not limited to these shapes. For example, the width of the plate springs does not need to be constant, and the width may be adjusted as necessary. In addition, although the height in the Z direction of contact surfaces between the mirror holder 113 and the plate springs and the height in the Z direction of contact surfaces between the fixing tables 117a to 117d and the plate springs are aligned in the above-described exemplary embodiment, it is not necessary to do so. Since the stiffness for the vibration in the L3 axis direction (refer to FIG. 16) is not changed even if the heights of both contact surfaces are displaced, the effect that the unwanted resonance mode frequency is kept in a high frequency band is not changed.

The configuration of the mirror tilt actuator 110 has been described above.

Next, the operation of the imaging device 100 will be described.

As illustrated in FIG. 1, reflected light from a subject (subject light) is incident on the lens 101. The subject light incident on the lens 101 is reflected by the mirror 102. The subject light reflected by the mirror 102 is incident on the imaging element 103. Accordingly, the imaging element 103 can image the subject light.

Here, the mirror tilt actuator 110 drives the mirror 102 so as to change the optical axis of the lens OAL. The optical axis of the lens OAL is an optical axis to be incident on the central part of the imaging element C in the subject light exited from the lens 101. As illustrated in FIG. 1, the mirror tilt actuator 110 changes the optical axis of the lens OAL from the optical axis of the lens before the change OAL1 to the optical axis of the lens after the change OAL2 by driving the mirror 102 using the above-described driving means and the like.

The operation of the imaging device 100 has been described above.

As described above, the imaging device 100 in the first exemplary embodiment of the present invention includes the imaging element 103, the mirror 102, the lens 101, and the mirror tilt actuator 110. The imaging element 103 images the subject light that is reflected light from a subject. The mirror 102 reflects the subject light, and makes the subject light incident on the imaging element 103. The lens 101 collects the subject light on the mirror 102. The mirror tilt actuator 110 drives the mirror 102 so as to change the optical axis of the lens OAL. The optical axis of the lens OAL is an optical axis to be incident on the central part C of the imaging element 103 in the subject light exited from the lens 101.

In addition, the mirror tilt actuator 110 includes the base 117, the mirror holder 113 that holds the mirror 102, an elastic member, and driving means. The elastic member is the plate springs 115a to 115d, the plate springs 115Aa to 115Aa, or the plate springs 115Ba to 115Bd. The driving means is configured by the coils 116a to 116d and the magnetic circuits 118a to 118d. The elastic member supports the mirror holder 113 on the base 117 such that the mirror holder 113 can move with respect to the base 117. The driving means tilts the mirror holder 113 with respect to the base 117 to change the optical axis of the lens OAL to a desired direction. In addition, the driving means has the coils 116a to 116d attached to the base 117 and the magnetic circuits 118a to 118d having the permanent magnets, which are attached to the mirror holder 113. The driving means tilts the mirror holder 113 in a direction perpendicular to the direction of the magnetic moment of the permanent magnets using electromagnetic force acting on between the coils 116a to 116d and the magnetic circuits 118a to 118d.

As just described, the driving means of the mirror tilt actuator 110 tilts the mirror holder 113 with respect to the base 117 to change the optical axis of the lens OAL to a desired direction. In addition, the driving means has the coils 116a to 116d attached to the base 117 and the magnetic circuits 118a to 118d having the permanent magnets, which are attached to the mirror holder. The driving means tilts the mirror holder 113 in a direction perpendicular to the direction of the magnetic moment of the permanent magnets using electromagnetic force acting between the coils 116a to 116d and the magnetic circuits 118a to 118d. By using the foregoing configuration, in the mirror tilt actuator 110, the unwanted resonance modes are moved to 1000 Hz, and a wide control bandwidth can be ensured while maintaining the gain of the generated tilt, as described using FIG. 15. As a result, the mirror tilt actuator 110 can ensure wide-angle driving and high-accuracy control compared to a general biaxial piezo imaging device. In addition, in the mirror tilt actuator 110, the driving means is configured by the coils 116a to 116d and the magnetic circuits 118a to 118d. Thus, the response speed can be increased compared to a biaxial cymbal imaging device that drives a mirror using a motor. As a result, for example, even when the vibrational frequency based on a shaking disturbance and a posture change applied to the imaging device 100 becomes several hundred Hz or more, the vibration due to the shaking disturbance and the posture change can be absorbed by only the movement of the mirror 102.

Therefore, according to the imaging device 100 in the first exemplary embodiment of the present invention, the mirror 102 can be driven in a wide driving range and at a fast response speed.

Second Exemplary Embodiment

Figure 17:
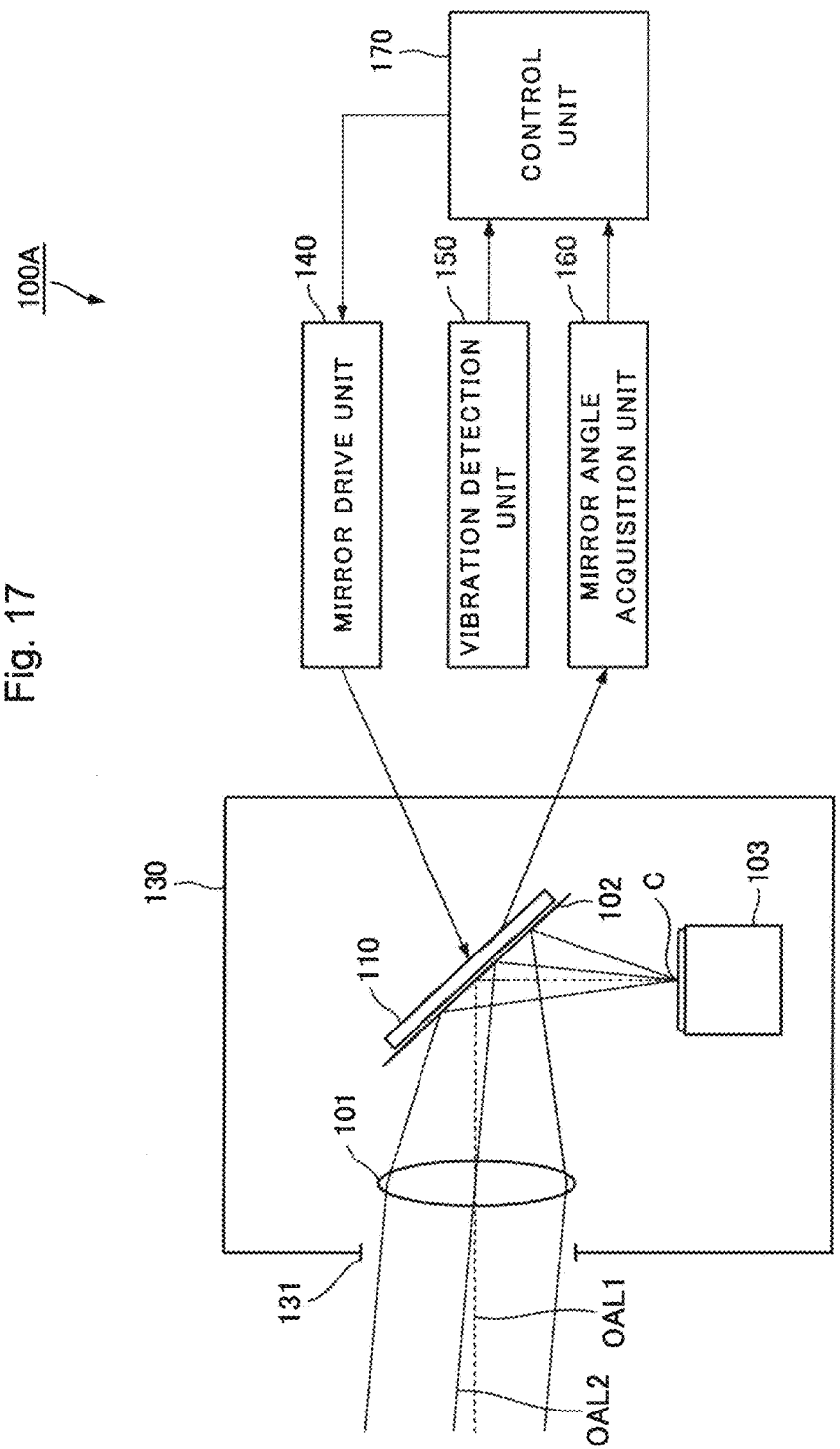
FIG. 17 is a diagram illustrating a configuration of an imaging device in a second exemplary embodiment of the present invention.
Figure 18:
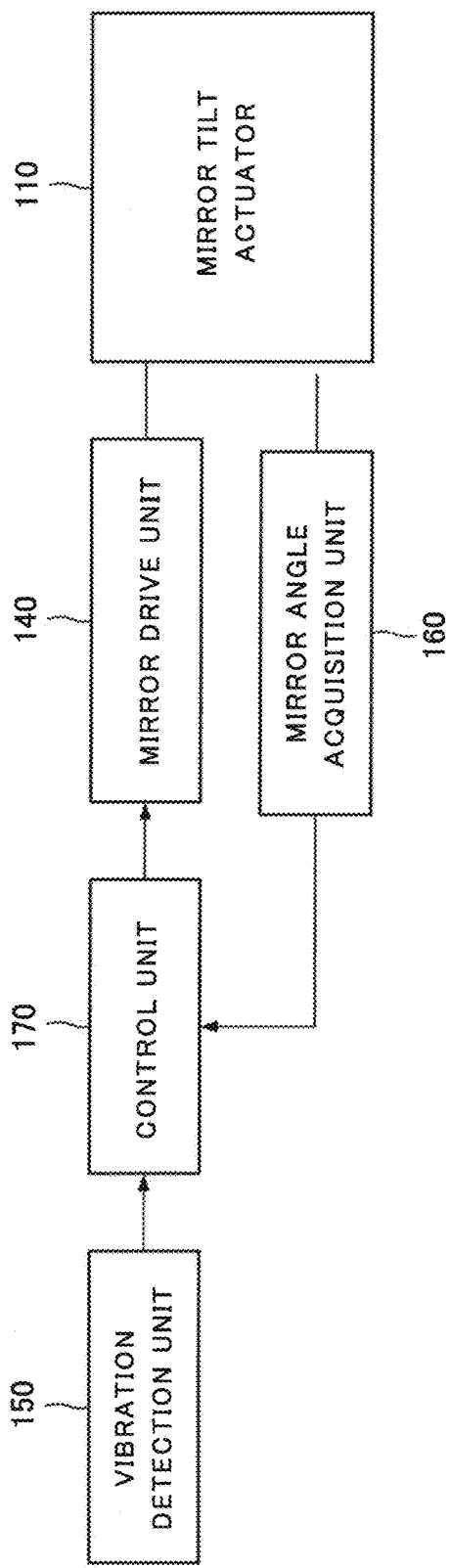
FIG. 18 is a block diagram for describing the configuration of the imaging device in the second exemplary embodiment of the present invention.

FIG. 17 is a diagram illustrating a configuration of an imaging device 100A in a second exemplary embodiment of the present invention. FIG. 18 is a block diagram for describing the configuration of the imaging device 100A.

As illustrated in FIG. 17, the imaging device 100A includes the lens 101, the mirror 102, the imaging element 103, the mirror tilt actuator 110, a housing 130, a mirror drive unit 140, a vibration detection unit 150, a mirror angle acquisition unit 160, and a control unit 170. It is to be noted that, in FIG. 17 and FIG. 18, the same configurations as the respective components illustrated in FIG. 1 to FIG. 16 are denoted by the same reference numerals as the reference numerals illustrated in FIG. 1 to FIG. 16. In addition, the arrow direction in FIG. 17 and FIG. 18 is an example, and does not limit the signal direction between blocks.

Here, FIG. 1 and FIG. 17 are compared. FIG. 17 is different from FIG. 1 in that the housing 130, the mirror drive unit 140, the vibration detection unit 150, the mirror angle acquisition unit 160, and the control unit 170 are provided.

As illustrated in FIG. 17, the housing 130 houses the imaging element 103, the mirror 102, the lens 101, and the mirror tilt actuator 110. The housing 130 has an opening 131. Subject light is incident on the lens 101 through the opening 131.

As illustrated in FIG. 17 and FIG. 18, the mirror drive unit 140 is connected to the mirror tilt actuator 110 and the control unit 170. The mirror drive unit 140 drives the mirror tilt actuator 110.

As illustrated in FIG. 17 and FIG. 18, the vibration detection unit 150 is connected to the control unit 170. The vibration detection unit 150 detects vibration applied to the housing 130. The vibration detected by the vibration detection unit 150 is generated by, for example, a shaking disturbance that is external force due to vibration of an aircraft itself and turbulence, and a posture change generated by the vibration of the aircraft itself and the turbulence. In addition, the vibration detection unit 150 can also detect vibration generated by a translation movement and a rotational movement generated in the housing 130, for example. It is to be noted that the vibration detection unit 150 is configured by an angular velocity sensor or an angle sensor, for example.

As illustrated in FIG. 17 and FIG. 18, the mirror angle acquisition unit 160 is connected to the mirror tilt actuator 110 and the control unit 170. The mirror angle acquisition unit 160 acquires a mirror angle that is an installation angle of the mirror 102 from the mirror tilt actuator 110.

As illustrated in FIG. 17 and FIG. 18, the control unit 170 is connected to the mirror drive unit 140, the vibration detection unit 150, and the mirror angle acquisition unit 160. The control unit 170 instructs the mirror drive unit 140 to perform control to change the mirror angle so as to counteract the vibration, on the basis of the vibration detected by the vibration detection unit 150 and the mirror angle acquired by the mirror angle acquisition unit 160.

The configuration of the imaging device 100A has been described above.

Next, the operation of the imaging device 100A will be described.

As illustrated in FIG. 17, reflected light from a subject (subject light) is incident on the lens 101. The subject light incident on the lens 101 is reflected by the mirror 102. The subject light reflected by the mirror 102 is incident on the imaging element 103. Accordingly, the imaging element 103 can image the subject light.

Here, the vibration detection unit 150 detects vibration applied to the housing 130, and outputs the detection result to the control unit 170.

In addition, the mirror angle acquisition unit 160 acquires a present mirror angle from the mirror tilt actuator 110, and outputs the acquisition result to the control unit 170.

Next, the control unit 170 instructs the mirror drive unit 140 to perform control to change the mirror angle so as to counteract the vibration, on the basis of the vibration detected by the vibration detection unit 150 and the mirror angle acquired by the mirror angle acquisition unit 160.

The mirror drive unit 140 drives the mirror tilt actuator 110 in accordance with the instruction of the control unit 170.

The operation of the imaging device 100A has been described above.

As described above, the imaging device 100A in the second exemplary embodiment of the present invention further includes the housing 130, the mirror drive unit 140, the vibration detection unit 150, the mirror angle acquisition unit 160, and the control unit 170. The housing 130 houses the imaging element 103, the mirror 102, the lens 101, and the mirror tilt actuator 110. The vibration detection unit 150 detects the vibration applied to the housing 130. The mirror angle acquisition unit 160 acquires the mirror angle that is an installation angle of the mirror 102 from the mirror tilt actuator 110. The mirror drive unit 140 drives the mirror tilt actuator 110. The control unit 170 instructs the mirror drive unit 140 to perform the control to change the mirror angle so as to counteract the vibration, on the basis of the vibration detected by the vibration detection unit 150 and the mirror angle acquired by the mirror angle acquisition unit 160.

As just described, the control unit 170 instructs the mirror drive unit 140 to perform the control to change the mirror angle so as to counteract the vibration, on the basis of the vibration detected by the vibration detection unit 150 and the mirror angle acquired by the mirror angle acquisition unit 160. Accordingly, the mirror tilt actuator 110 is driven by the mirror drive unit 140 so as to counteract the vibration applied to the housing 130. More specifically, the driving means of the mirror tilt actuator 110 drives the mirror 102 so as to counteract the vibration applied to the housing 130 to change the optical axis of the lens OAL. As a result, the optical axis of the lens OAL, which is an optical axis to be incident on the central part C of the imaging element 103 in the subject light, is fixed in a given direction regardless of the vibration applied to the housing 130. Therefore, a captured image of the imaging element 103 can be stabilized. More specifically, the imaging device 100A can generate a sharp captured image without blurring, for example.

In addition, in the imaging device 100A in the second exemplary embodiment of the present invention, the vibration detection unit 150 may detect a change in an angular velocity or an angle of the housing 130 in a predetermined direction, and detect the vibration applied to the housing 130 on the basis of the detection result. Accordingly, the vibration applied to the housing 130 can be detected with a simple device.

Third Exemplary Embodiment

Figure 19:
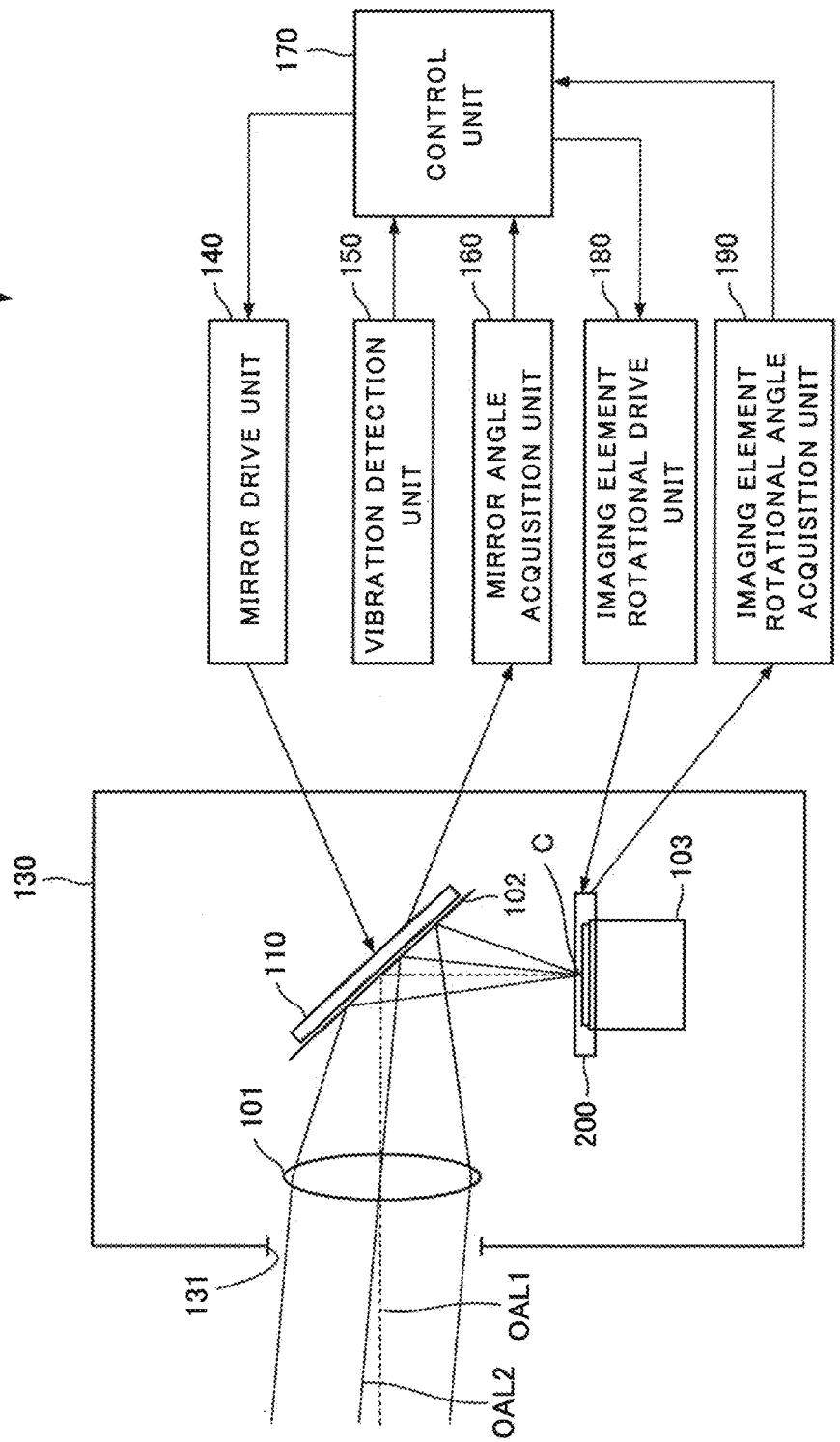
FIG. 19 is a diagram illustrating a configuration of an imaging device in a third exemplary embodiment of the present invention.

FIG. 19 is a diagram illustrating a configuration of an imaging device 100B in a third exemplary embodiment of the present invention.

As illustrated in FIG. 19, the imaging device 100B includes the lens 101, the mirror 102, the imaging element 103, the mirror tilt actuator 110, the housing 130, the mirror drive unit 140, the vibration detection unit 150, the mirror angle acquisition unit 160, the control unit 170, an imaging element rotational drive unit 180, an imaging element rotational angle acquisition unit 190, and an imaging element rotational mechanism 200. It is to be noted that, in FIG. 19, the same configurations as the respective components illustrated in FIG. 1 to FIG. 18 are denoted by the same reference numerals as the reference numerals illustrated in FIG. 1 to FIG. 18. In addition, the arrow direction in FIG. 19 is an example, and does not limit the signal direction between blocks.

Here, FIG. 17 and FIG. 19 are compared. FIG. 19 is different from FIG. 17 in that the imaging element rotational drive unit 180, the imaging element rotational angle acquisition unit 190, and the imaging element rotational mechanism 200 are further provided.

As illustrated in FIG. 19, the imaging element rotational drive unit 180 is connected to the imaging element rotational mechanism 200 and the control unit 170. The imaging element rotational drive unit 180 drives the imaging element rotational mechanism 200.

As illustrated in FIG. 19, the imaging element rotational angle acquisition unit 190 is connected to the imaging element rotational mechanism 200 and the control unit 170. The imaging element rotational angle acquisition unit 190 acquires an imaging element rotational angle that is an angle with the optical axis of the imaging element 103 of the imaging element rotational mechanism 200 as a center.

As illustrated in FIG. 19, the imaging element rotational mechanism 200 rotates the imaging element 103 about the optical axis of the imaging element 103.

The control unit 170 generates a control signal on the basis of the vibration detected by the vibration detection unit 150, the mirror angle acquired by the mirror angle acquisition unit 160, and the imaging element rotational angle acquired by the imaging element rotational angle acquisition unit 190. The control unit 170 instructs the mirror drive unit 140 and the imaging element rotational drive unit 180 to perform control to change the mirror angle and the imaging element rotational angle so as to counteract the vibration, using the control signal.

The configuration of the imaging device 100B has been described above.

Next, the operation of the imaging device 100B will be described.

As illustrated in FIG. 19, reflected light from a subject (subject light) is incident on the lens 101. The subject light incident on the lens 101 is reflected by the mirror 102. The subject light reflected by the mirror 102 is incident on the imaging element 103. Accordingly, the imaging element 103 can image the subject light.

Here, the vibration detection unit 150 detects vibration applied to the housing 130, and outputs the detection result to the control unit 170.

In addition, the mirror angle acquisition unit 160 acquires a present mirror angle from the mirror tilt actuator 110, and outputs the acquisition result to the control unit 170.

Furthermore, the imaging element rotational angle acquisition unit 190 acquires an imaging element rotational angle that is an angle with the optical axis of the imaging element 103 of the imaging element rotational mechanism 200 as a center.

Next, the control unit 170 generates a control signal on the basis of the vibration detected by the vibration detection unit 150, the mirror angle acquired by the mirror angle acquisition unit 160, and the imaging element rotational angle acquired by the imaging element rotational angle acquisition unit 190. The control unit 170 instructs the mirror drive unit 140 and the imaging element rotational drive unit 180 to perform control to change the mirror angle and the imaging element rotational angle so as to counteract the vibration, using the control signal.

The mirror drive unit 140 drives the mirror tilt actuator 110 in accordance with the instruction of the control unit 170.

In addition, the imaging element rotational drive unit 180 rotates the imaging element 103 about the optical axis of the imaging element 103 in accordance with the instruction of the control unit 170.

The operation of the imaging device 100B has been described above.

As described above, the imaging device 100B in the third exemplary embodiment of the present invention further includes the imaging element rotational drive unit 180, the imaging element rotational angle acquisition unit 190, and the imaging element rotational mechanism 200. The imaging element rotational mechanism 200 rotates the imaging element 103 about the optical axis of the imaging element 103. The imaging element rotational drive unit 180 drives the imaging element rotational mechanism 200. The imaging element rotational angle acquisition unit 190 acquires the imaging element rotational angle that is an angle with the optical axis of the imaging element 103 of the imaging element rotational mechanism 200 as a center. The control unit 170 instructs the mirror drive unit 140 and the imaging element rotational drive unit 180 to perform the control to change the mirror angle and the imaging element rotational angle so as to counteract the vibration, on the basis of the vibration detected by the vibration detection unit 150, the mirror angle acquired by the mirror angle acquisition unit 160, and the imaging element rotational angle acquired by the imaging element rotational angle acquisition unit 190.

As just described, the control unit 170 instructs the mirror drive unit 140 and the imaging element rotational drive unit 180 to perform the control to change the mirror angle and the imaging element rotational angle so as to counteract the vibration, on the basis of the vibration detected by the vibration detection unit 150, the mirror angle acquired by the mirror angle acquisition unit 160, and the imaging element rotational angle acquired by the imaging element rotational angle acquisition unit 190.

Accordingly, the mirror tilt actuator 110 is driven by the mirror drive unit 140 so as to counteract the vibration applied to the housing 130 in three axes directions. More specifically, the driving means of the mirror tilt actuator 110 drives the mirror 102 so as to counteract the vibration applied to the housing 130 in the three axes directions to change the optical axis of the lens OAL. As a result, the optical axis of the lens OAL, which is an optical axis to be incident on the central part C of the imaging element 103 in the subject light, is fixed more stably in a given direction regardless of the vibration applied to the housing 130. Therefore, a captured image of the imaging element 103 can be more stabilized in the three axes directions.

It is to be noted that modified examples of the present invention will be described below.

As modified examples of the imaging devices 100A, 100B of the second and third exemplary embodiments, super-resolution that is resolution of equal to or more than the number of pixels of the imaging element 103 can also be obtained by changing the mirror angle multiple times at an angle in a range smaller than a viewing angle per one pixel of the imaging element 103.

Figure 20:
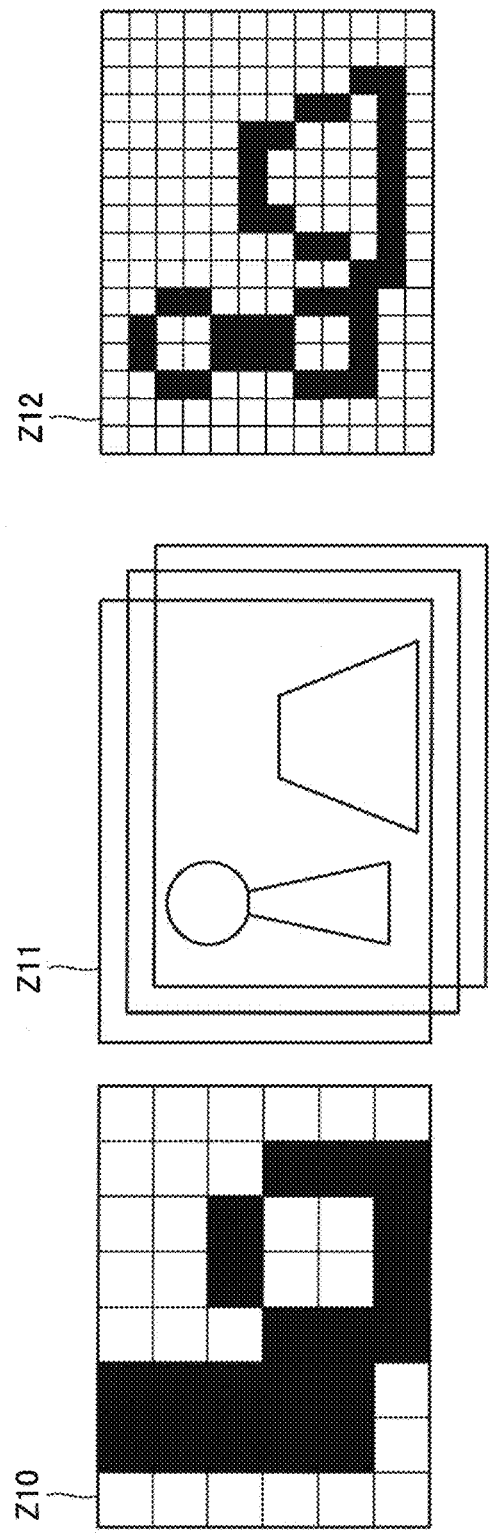
FIG. 20 is a diagram for describing a generation process of a captured image when a mirror angle is changed multiple times.

FIG. 20 is a diagram for describing a generation process of a captured image when the mirror angle is changed multiple times.

As illustrated in FIG. 20, first, the imaging element 103 images a captured image Z10. Then, the control unit 170 outputs an instruction, to the mirror drive unit 140, to change the mirror angle multiple times at an angle in a range smaller than a viewing angle per one pixel of the imaging element 103. Then, the mirror drive unit 140 changes the mirror angle multiple times at an angle in a range smaller than a viewing angle per one pixel of the imaging element 103 in accordance with the instruction of the control unit 170. At this time, the imaging element 103 images subject light multiple times with the change of the mirror angle to generate a plurality of captured images Z11. Finally, the imaging element 103 synthesizes the plurality of captured images Z11. Accordingly, the imaging element 103 can generate a synthetic image Z12 obtained by overlaying the captured images Z11 of the subject light imaged multiple times.

In the imaging devices 100A, 100B in the second and third exemplary embodiments of the present invention, the control unit 170 instructs, to the mirror drive unit 140, to change the mirror angle multiple times at an angle in a range smaller than a viewing angle per one pixel of the imaging element 103. In addition, the mirror drive unit 140 changes the mirror angle multiple times in accordance with the instruction of the control unit 170. Then, the imaging element 103 images subject light multiple times with the change of the mirror angle to generate the synthetic image Z12 obtained by overlapping the captured images Z11 of the subject light imaged multiple times.

As described above, the mirror tilt actuator 110 can ensure high-accuracy control compared to a general biaxial piezo imaging device. In addition, the mirror tilt actuator 110 can increase the response speed compared to a biaxial cymbal imaging device that drives a mirror using a motor. As just described, the mirror tilt actuator 110 has feature of capable of driving the mirror at high speed and in a minute range. By utilizing the foregoing mirror tilt actuator 110, the synthetic image Z12 obtained by overlaying the captured images Z11 of the subject light imaged multiple times can be obtained at high resolution.

In addition, as modified examples of the imaging devices 100, 100A, 100B of the first, second, and third exemplary embodiments, the sensitivity of the imaging element 103 can also be corrected by imaging the same subject light while displacing the optical axis of the lens OAL.

Figure 21:
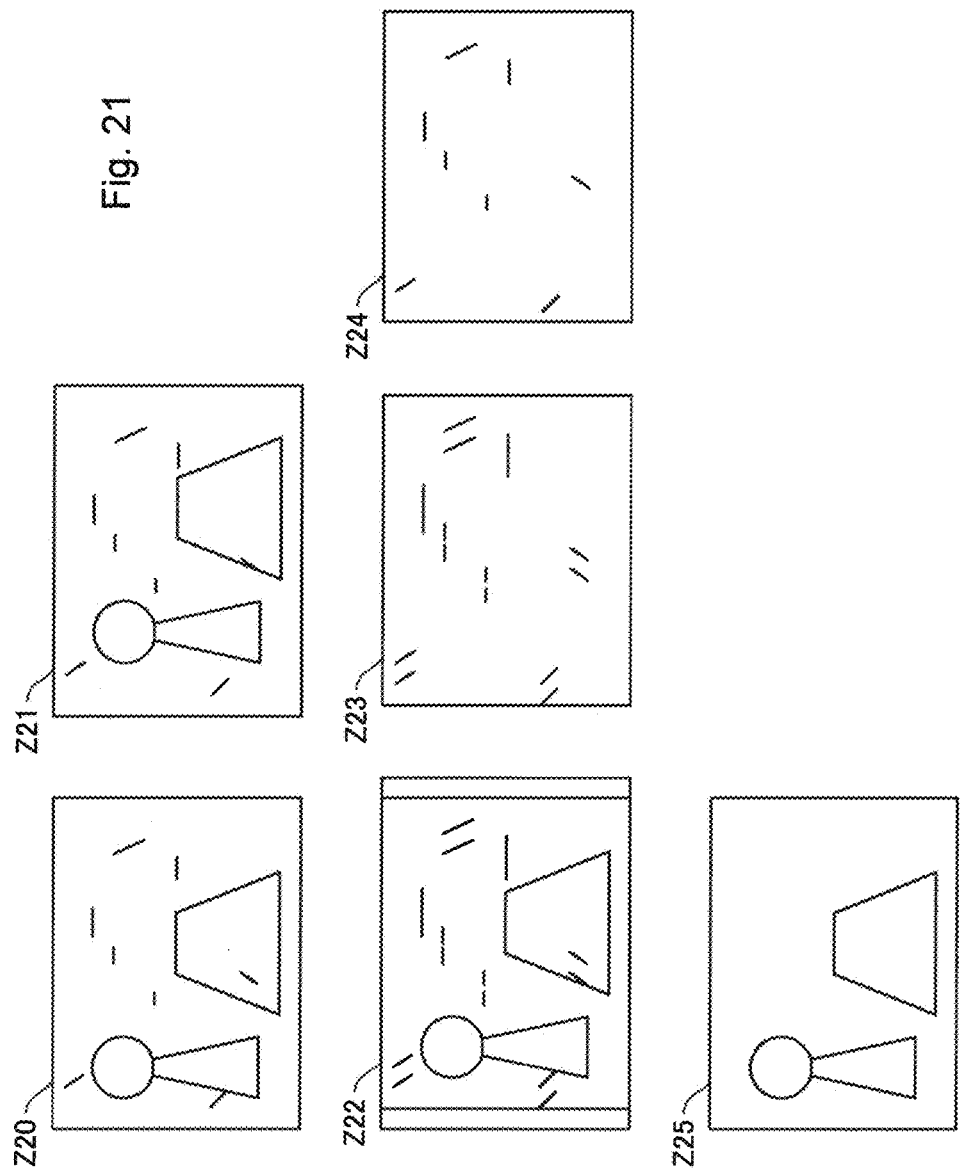
FIG. 21 is a diagram for describing a generation process of a captured image when the same subject light is imaged while displacing an optical axis of a lens.

FIG. 21 is a diagram for describing a generation process of a captured image when the same subject light is imaged while displacing the optical axis of the lens OAL.

As illustrated in FIG. 21, first, the imaging element 103 images the same subject light while displacing the optical axis of the lens OAL to acquire a captured image Z20 and a captured image Z21. Next, the control unit 170 generates a difference image Z22 between the captured image Z20 and the captured image Z21. At this time, since an angle difference of the optical axis of the lens OAL between the captured image Z20 and the captured image Z21 and an angle per one pixel have been already recognized by the control unit 170, the control unit 170 performs alignment of the captured image Z20 and the captured image Z21 as illustrated in Z22 using the information to generate a difference image Z23. At this time, in the difference image Z23, fixed pattern noise appears doubly in an interval of parallel translation generated during the alignment of the captured image Z20 and the captured image Z21.

Next, the control unit 170 takes a difference between the captured image Z20 and the captured image Z21 in the interval of parallel translation generated during the alignment of the captured image Z20 and the captured image Z21 to acquire a fixed pattern noise image Z24.

Next, the control unit 170 removes the fixed pattern noise image Z24 from the captured image Z20 to acquire an image in which the fixed pattern noise is removed Z25.

It is to be noted that, in the image in which the fixed pattern noise is removed Z25, influence due to random noise and sensitivity unevenness other than the fixed pattern noise is sometimes caused. In this case, the influence can be reduced by using images obtained by displacing the optical axis of the lens OAL at a plurality of angles.

In the imaging devices 100, 100A, 100B in the first, second, and third exemplary embodiments, the imaging element 103 acquires the two captured images Z20, Z21 obtained by imaging the subject light while moving the optical axis of the lens OAL. The control unit 170 generates the difference image Z22 indicating a difference between the two captured images Z20, Z21, acquires the fixed pattern noise image Z24 indicating fixed pattern noise that is an image other than the subject, and generates the image Z25 obtained by removing the fixed pattern noise image Z24 from one of the two captured images Z20, Z21. Accordingly, the image in which the fixed pattern noise is removed can be acquired.

In addition, as modified examples of the imaging devices 100A, 100B of the second and third exemplary embodiments, the mirror drive unit 140 can also move the mirror tilt actuator 110 such that the subject light is focused on the imaging element 103 to form an image.

Figure 22:
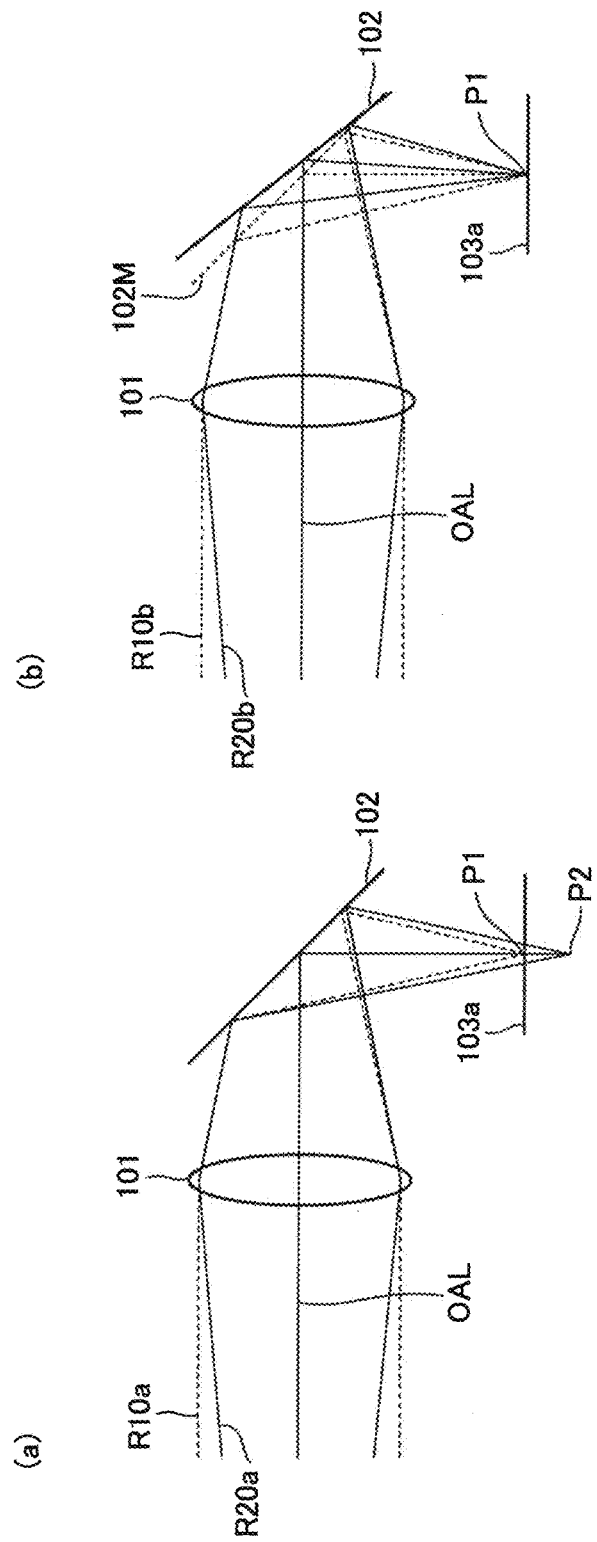
FIG. 22 is diagrams for describing a process in which a mirror is moved by a mirror tilt actuator.

FIG. 22 is diagrams for describing a process in which the mirror 102 is moved by the mirror tilt actuator 110. FIG. 22(a) is a diagram illustrating a state of the imaging device before the mirror 102 is moved. FIG. 22(b) is a diagram illustrating a state of the imaging device after the mirror 102 is moved.

As illustrated in FIG. 22(a), a light ray R10a of the subject light exited from a position distant from the lens 101 is incident on the mirror 102 through the lens 101, is reflexed by the mirror 102, and then, forms an image on a position P1 on an imaging surface 103a of the imaging element 103.

In contrast, as illustrated in FIG. 22(a), a light ray R20a of the subject light exited from a position closer to the lens 101, which is the same direction as that of the light ray R10a, is incident on the mirror 102 through the lens 101, is reflexed by the mirror 102, and then, forms an image on a position P2 different from the imaging surface 103a of the imaging element 103. In this case, the image of the light ray R20 on the imaging surface 103a is an out-of-focus and blurred image. Here, the out of focus may not be corrected only by rotating the mirror 102.

In contrast, by using the mirror tilt actuator 110, not only the rotation but also the position of the mirror 102 can be changed at the same time, and the out of focus can be corrected.

As illustrated in FIG. 22(b), the mirror drive unit 140 drives the mirror tilt actuator 110 to move the mirror 102 to a position of a mirror 102M such that the subject light is focused on the imaging element 103 to form an image.

At this time, as illustrated in FIG. 22(b), a light ray R10b of the subject light exited from a position distant from the lens 101 is incident on the mirror 102 through the lens 101, is reflexed by the mirror 102, and then, forms an image on the position P1 on the imaging surface 103a of the imaging element 103, in the same manner as the light ray R10a described in FIG. 22(a).

In addition, as illustrated in FIG. 22(b), by moving the angle of the mirror 102 to the position of the mirror 102M, a light ray R20b of the subject light exited from a position closer to the lens 101, which is the same direction as the light ray R10b, is incident on the mirror 102M through the lens 101, is reflexed by the mirror 102, and then, forms an image on the position P1 on the imaging surface 103a of the imaging element 103. In this case, the image of the light ray R20b on the imaging surface 103a is a focused and unblurred image.

As described above, in the imaging devices 100A, 100B of the second and third exemplary embodiments, the mirror drive unit 140 drives the mirror tilt actuator 110 such that the subject light is focused on the imaging element 103 to form an image. Accordingly, the imaging element 103 can generate a focused, unblurred, and sharp image.

Fourth Exemplary Embodiment

Figure 23:
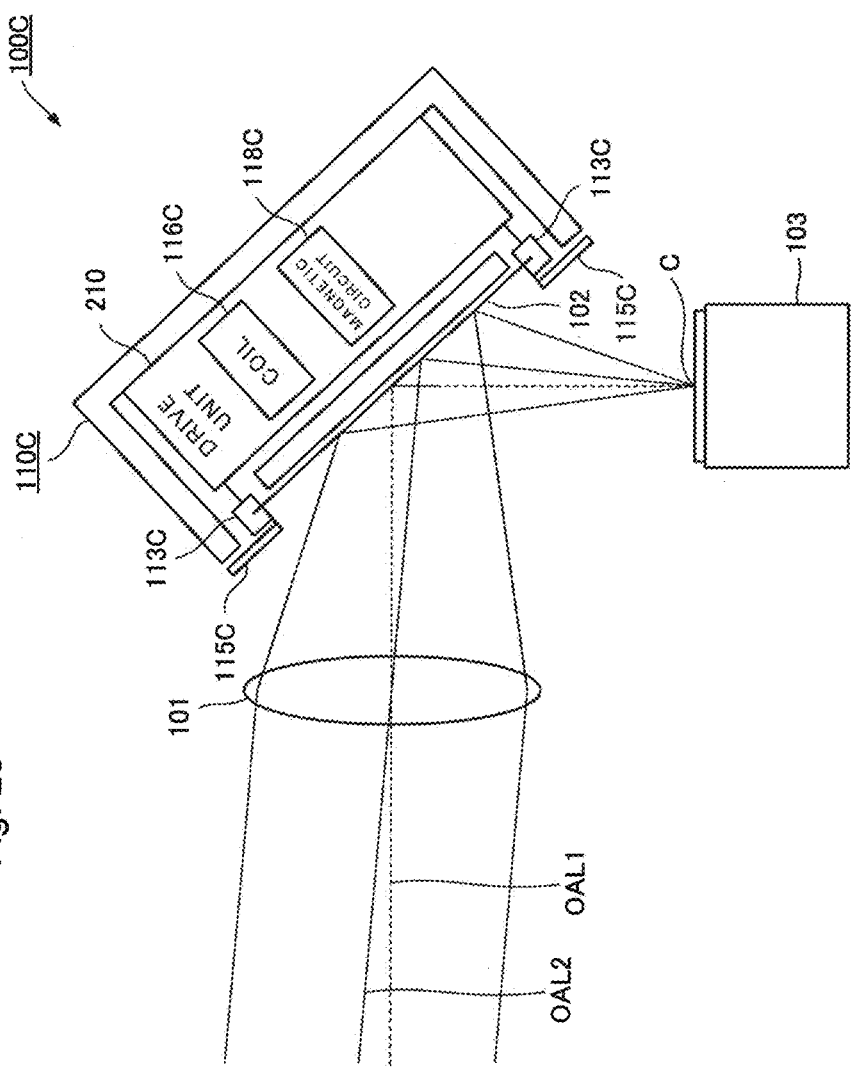
FIG. 23 is a diagram illustrating a configuration of an imaging device in a fourth exemplary embodiment of the present invention.

FIG. 23 is a diagram illustrating a configuration of an imaging device 100C in a fourth exemplary embodiment of the present invention.

As illustrated in FIG. 23, the imaging device 100 includes the lens 101, the mirror 102, the imaging element 103, and a mirror tilt actuator 110C. It is to be noted that, in FIG. 23, the same configurations as the respective components illustrated in FIG. 1 to FIG. 22 are denoted by the same reference numerals as the reference numerals illustrated in FIG. 1 to FIG. 22.

As illustrated in FIG. 23, the lens 101 is provided so as to be opposed to the mirror 102. The lens 101 collects subject light that is reflected light from a subject on the mirror 102.

The mirror 102 reflects the subject light, and makes the subject light incident on the imaging element 103.

The imaging element 103 images the subject light that is reflected light from a subject.

As illustrated in FIG. 23, the mirror tilt actuator 110C drives the mirror 102 so as to change an optical axis of the lens OAL, which is an optical axis to be incident on the central part C of the imaging element 103 in the subject light exited from the lens 101. It is to be noted that, in FIG. 23, an optical axis of the lens before the change OAL1 and an optical axis of the lens after the change OAL2 are illustrated, in the same manner as FIG. 1.

Here, the configuration of the mirror tilt actuator 110C will be described in detail. It is to be noted that the configuration of the mirror tilt actuator 110C corresponds to the mirror tilt actuator described in PTL 1.

As illustrated in FIG. 23, the mirror tilt actuator 110C includes a base 117C, a plate spring 113C, and a drive unit 210. The plate spring 113C corresponds to the elastic member of the present invention. The drive unit 210 corresponds to the driving means of the present invention.

As illustrated in FIG. 23, a mirror holder 113C holds the mirror 102. The plate spring 115C supports the mirror holder 113C on the base 117C such that the mirror holder 113C can move with respect to the base 117C. The drive unit 2100 includes a coil 116C and a magnetic circuit 118C. The drive unit 210 tilts the mirror holder 113C with respect to the base 117C to change the optical axis of the lens OAL to a desired direction. The coil 116C is attached to the base 117C. The magnetic circuit 118C is attached to the mirror holder 113C, and has a permanent magnet. The drive unit 210 tilts the mirror holder 113C in a direction perpendicular to the direction of magnetic moment of the permanent magnet using electromagnetic force acting between the coil and the magnetic circuit.

The configuration of the imaging device 100C has been described above.

Next, the operation of the imaging device 100C will be described.

As illustrated in FIG. 23, reflected light from a subject (subject light) is incident on the lens 101. The subject light incident on the lens 101 is reflected by the mirror 102. The subject light reflected by the mirror 102 is incident on the imaging element 103. Accordingly, the imaging element 103 can image the subject light.

Here, the mirror tilt actuator 110C drives the mirror 102 so as to change the optical axis of the lens OAL. The optical axis of the lens OAL is an optical axis to be incident on the central part of the imaging element C in the subject light exited from the lens 101. As illustrated in FIG. 23, the mirror tilt actuator 110C changes the optical axis of the lens OAL from the optical axis of the lens before the change OAL1 to the optical axis of the lens after the change OAL2 by driving the mirror 102 using the above-described driving means and the like.

The operation of the imaging device 100C has been described above.

As described above, the imaging device 100C in the fourth exemplary embodiment of the present invention includes the imaging element 103, the mirror 102, the lens 101, and the mirror tilt actuator 110C. The imaging element 103 images the subject light that is reflected light from a subject. The mirror 102 reflects the subject light, and makes the subject light incident on the imaging element 103. The lens 101 collects the subject light on the mirror 102. The mirror tilt actuator 110C drives the mirror 102 so as to change the optical axis of the lens OAL. The optical axis of the lens OAL is an optical axis to be incident on the central part C of the imaging element 103 in the subject light exited from the lens 101.

In addition, the mirror tilt actuator 110C includes the base 117C, the mirror holder 113C that holds the mirror 102, an elastic member, and the drive unit 210. The elastic member is the plate spring 115C. The drive unit 210 is configured by the coil 116C and the magnetic circuit 118C. The elastic member supports the mirror holder 113C on the base 117C such that the mirror holder 113C can move with respect to the base 117C. The drive unit 210 tilts the mirror holder 113C with respect to the base 117C to change the optical axis of the lens OAL to a desired direction. In addition, the drive unit 210 has the coil 116C attached to the base 117C and the magnetic circuit 118C having the permanent magnet, which is attached to the mirror holder 113C. The drive unit 210 tilts the mirror holder 113C in a direction perpendicular to the direction of the magnetic moment of the permanent magnet using electromagnetic force acting between the coil 116C and the magnetic circuit 118C.

As just described, the drive unit 210 of the mirror tilt actuator 110C tilts the mirror holder 113C with respect to the base 117C to change the optical axis of the lens OAL to a desired direction. In addition, the drive unit 210 has the coil 116C attached to the base 117C and the magnetic circuit 118C having the permanent magnet, which is attached to the mirror holder 113C. The drive unit 210 tilts the mirror holder 113C in a direction perpendicular to the direction of the magnetic moment of the permanent magnet using electromagnetic force acting between the coil 116C and the magnetic circuit 118C. By using the foregoing configuration, a wide control bandwidth can be ensured while maintaining the gain of the generated tilt, in the same manner as the contents described in the first exemplary embodiment. As a result, the mirror tilt actuator 110C can ensure wide-angle driving and high-accuracy control compared to a general biaxial piezo imaging device. In addition, in the mirror tilt actuator 110C, the driving means is configured by the coil 116C and the magnetic circuit 118C. Thus, the response speed can be increased compared to a biaxial cymbal imaging device that drives a mirror using a motor. As a result, for example, even when the vibrational frequency based on a shaking disturbance and a posture change applied to the imaging device 100C becomes several hundred Hz or more, the vibration due to the shaking disturbance and the posture change can be absorbed by only the movement of the mirror 102.

Therefore, according to the imaging device 100C in the fourth exemplary embodiment of the present invention, the mirror 102 can be driven in a wide driving range and at a fast response speed.

As above, the present invention has been described based on the exemplary embodiments. An exemplary embodiment is just an illustration, and various kinds of changes, addition or subtraction and combinations may be added to each of the above-mentioned exemplary embodiments unless it deviates from the main points of the present invention. It is understood by a person skilled in the art that modification made by adding such changes, addition/subtraction and combinations are also included in the scope of the present invention.

Although the present invention has been described above with reference to the exemplary embodiments (and the examples), the present invention is not limited to the above-described exemplary embodiments (and the examples). For the configurations and the details of the present invention, various changes that can be understood by a person skilled in the art may be made within the scope of the present invention.

This application claims priority to Japanese Patent Application No. 2015-024959 filed on Feb. 12, 2015, the disclosure of which is incorporated herein by reference in its entirety.

REFERENCE SIGNS LIST 100, 100A, 100B Imaging device
101 Lens
102 Mirror
103 Imaging element
103a Imaging surface
110, 110C Mirror tilt actuator
111, 111A, 111B Movable part
113 Mirror holder
114 Torsion bar
115a to 115d Plate spring
115Aa to 115Ad Plate spring
115Ba to 115Bd Plate spring
115C Plate spring
116a to 116d Coil
117, 117C Base
118a to 118d Magnetic circuit
119 Yoke
120 Permanent magnet
130 Housing
131 Opening
140 Mirror drive unit
150 Vibration detection unit
160 Mirror angle acquisition unit
170 Control unit
180 Imaging element rotational drive unit
190 Imaging element rotational angle acquisition unit
200 Imaging element rotational mechanism
210 Drive unit

What is claimed is:

1. An imaging device comprising:
   an imaging element configured to image subject light that is reflected light from a subject;
   a mirror configured to reflect the subject light, and configured to make the subject light incident on the imaging element;
   a lens configured to collect the subject light on the mirror;
   a mirror tilt actuator configured to drive the mirror so as to change an optical axis of the lens, which is an optical axis to be incident on a central part of the imaging element in the subject light exited from the lens;
   a housing that houses the imaging element, the mirror, the lens, and the mirror tilt actuator;
   a vibration detector configured to detect vibration applied to the housing; and
   at least one processor configured to execute:
      a mirror angle acquisition unit configured to acquire a mirror angle that is an installation angle of the mirror;
      a mirror drive unit configured to drive the mirror tilt actuator; and
      a control unit configured to instruct the mirror drive unit to perform control to change the mirror angle so as to counteract the vibration, on the basis of the vibration detected by the vibration detector and the mirror angle acquired by the mirror angle acquisition unit,
   wherein the mirror tilt actuator includes:
      a base;
      a mirror holder that holds the mirror;
      an elastic member that supports the mirror holder on the base such that the mirror holder can move with respect to the base; and
      a driver configured to tilt the mirror holder with respect to the base to change the optical axis of the lens to a desired direction,
   wherein the driver includes a coil attached to the base and a magnetic circuit including a permanent magnet, which is attached to the mirror holder, and is configured to tilt the mirror holder in a direction perpendicular to a direction of magnetic moment of the permanent magnet using electromagnetic force acting between the coil and the magnetic circuit,
   wherein the imaging element is configured to acquire two captured images obtained by imaging the subject light while displacing the optical axis of the lens, and
   wherein the control unit is configured to generate a difference image indicating a difference between the two captured images, to acquire a fixed pattern noise image indicating fixed pattern noise that is an image other than the subject, and to generate an image obtained by removing the fixed pattern noise image from one of the two captured images.

2. The imaging device according to claim 1, wherein the vibration detector is configured to detect a change in an angular velocity or an angle of the housing in a predetermined direction, and to detect the vibration applied to the housing on the basis of the detection result.

3. The imaging device according to claim 1, further comprising:
   an imaging element rotational mechanism configured to rotate the imaging element about an optical axis of the imaging element;
   an imaging element rotational drive unit configured to drive the imaging element rotational mechanism; and
   an imaging element rotational angle acquisition unit configured to acquire an imaging element rotational angle that is an angle with the optical axis of the imaging element of the imaging element rotational mechanism as a center,
   wherein the control unit is configured to instruct the mirror drive unit and the imaging element rotational drive unit to perform control to change the mirror angle and the imaging element rotational angle so as to counteract the vibration, on the basis of the vibration detected by the vibration detector, the mirror angle acquired by the mirror angle acquisition unit, and the imaging element rotational angle acquired by the imaging element rotational angle acquisition unit.

4. The imaging device according to claim 1, wherein the mirror drive unit is configured to drive the mirror tilt actuator such that the subject light is focused on the imaging element to form an image.

* * * * *